US011644624B2

(12) United States Patent
Boccoleri et al.

(10) Patent No.: US 11,644,624 B2
(45) Date of Patent: *May 9, 2023

(54) SEPARABLE INFINITE ROTATION FIBER OPTIC AND SLIP RING ROTARY JOINT FOR SUSPENSION ARM

(71) Applicant: Stryker Corporation, Kalamazoo, MI (US)

(72) Inventors: Gianni Boccoleri, Lantana, TX (US); David Chase, Southlake, TX (US); Udo Tockweiler, Immendingen (DE); Frank Reiser, Schwenningen (DE)

(73) Assignee: Stryker Corporation, Kalamazoo, MI (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/208,976

(22) Filed: Mar. 22, 2021

(65) Prior Publication Data

US 2021/0318495 A1     Oct. 14, 2021

Related U.S. Application Data

(63) Continuation of application No. 16/877,306, filed on May 18, 2020, now Pat. No. 10,955,620, which is a (Continued)

(51) Int. Cl.
    *G02B 6/36*         (2006.01)
    *H04N 7/22*         (2006.01)

(52) U.S. Cl.
    CPC .............. *G02B 6/3604* (2013.01); *H04N 7/22* (2013.01)

(58) Field of Classification Search
    CPC .................................................... G02B 6/3604
(Continued)

(56) References Cited

U.S. PATENT DOCUMENTS 5,140,289 A     8/1992   Andrieu et al.
5,633,963 A     5/1997   Rickenbach et al.
(Continued)

FOREIGN PATENT DOCUMENTS

| DE | 202011005203 U1 | 8/2011 |
| WO | 2003/025453 A1 | 3/2003 |
| WO | 2014/075780 A1 | 5/2014 |

OTHER PUBLICATIONS

American Wire Gauge (AWG) Article, known before invention (3 pages).
(Continued)

*Primary Examiner* — Robert Tavlykaev
(74) *Attorney, Agent, or Firm* — Morrison & Foerster LLP

(57) ABSTRACT

An infinite rotation joint that allows members of a suspension arm assembly at the infinite rotation joint to have unlimited rotation relative to one another. The infinite rotation joint is configured to pass at least an optical signal therethrough. At least two portions of the infinite rotation joint are separable and can automatically form a unit when adjacent arms are connected together such that the infinite rotation joint can be separated into the at least two portions.

(Continued)

The at least two portions are configured to be automatically connected to allow the optical signal to pass therethrough once the at least two portions are engaged.

9 Claims, 29 Drawing Sheets

Related U.S. Application Data continuation of application No. 15/645,081, filed on Jul. 10, 2017, now Pat. No. 10,656,341.

(60) Provisional application No. 62/361,301, filed on Jul. 12, 2016.

(58) Field of Classification Search
USPC .................................................. 385/25, 26
See application file for complete search history.

(56) References Cited

U.S. PATENT DOCUMENTS

| | | | |
|---|---|---|---|
| 6,464,383 B1 | 10/2002 | Northington et al. | |
| 6,498,884 B1 | 12/2002 | Colvin et al. | |
| 7,352,929 B2* | 4/2008 | Hagen .................. | G02B 6/3604 |
| | | | 385/25 |
| 7,474,852 B1 | 1/2009 | Jachetta et al. | |
| 7,526,155 B2 | 4/2009 | Hirohashi et al. | |
| 7,792,400 B1 | 9/2010 | Zhang et al. | |
| 7,881,569 B2 | 2/2011 | Zhang et al. | |
| 8,355,607 B2 | 1/2013 | Zhang et al. | |
| 8,360,964 B2 | 1/2013 | Ertas | |
| 8,380,024 B1 | 2/2013 | Zhang et al. | |
| 8,417,075 B2 | 4/2013 | Violante et al. | |
| 8,965,151 B1 | 2/2015 | Zhang et al. | |
| 9,213,144 B2 | 12/2015 | Jones et al. | |
| 9,360,630 B2* | 6/2016 | Jenner .................. | G02B 6/3604 |
| 9,627,105 B2 | 4/2017 | Gobel et al. | |
| 9,709,749 B2* | 7/2017 | Yamazaki ............... | G02B 23/26 |
| 2004/0251390 A1 | 12/2004 | Wachob | |
| 2007/0053632 A1 | 3/2007 | Popp | |
| 2008/0002934 A1 | 1/2008 | Hagen et al. | |
| 2008/0225534 A1* | 9/2008 | Rus ........................ | F16M 13/02 |
| | | | 362/404 |
| 2009/0226131 A1 | 9/2009 | Zhang et al. | |
| 2012/0087624 A1* | 4/2012 | Zhang .................. | G02B 6/3604 |
| | | | 385/26 |
| 2013/0044976 A1 | 2/2013 | Zhang et al. | |
| 2014/0101953 A1 | 4/2014 | Briggs et al. | |
| 2014/0147077 A1 | 5/2014 | Doric | |
| 2015/0294767 A1 | 10/2015 | Gobel et al. | |
| 2016/0091117 A1 | 3/2016 | Boccoleri et al. | |
| 2018/0120510 A1 | 5/2018 | Sullivan | |

OTHER PUBLICATIONS

Boccoleri et al., U.S. Notice of Allowance dated Nov. 13, 2020, directed to U.S. Appl. No. 16/877,306; 13 pages.
Boccoleri et al., U.S. Notice of Allowance dated Jan. 15, 2020, directed to U.S. Appl. No. 15/645,081; 15 pages.
Boccoleri et al., U.S. Office Action dated Aug. 16, 2019, directed to U.S. Appl. No. 15/645,081; 18 pages.
Boccoleri et al., U.S. Office Action dated Aug. 29, 2018, directed to U.S. Appl. No. 15/645,081; 15 pages.
Boccoler et al., U.S. Office Action dated Mar. 20, 2019, directed to U.S. Appl. No. 15/645,081; 18 pages.
Compatibility Matters Brochure, Stryker Communications, 2007 (2 pages).
Decision to Grant dated Mar. 17, 2022, directed to EP Application No. 17 193 933.3; 7 pages.
Extended European Search Report dated Jul. 5, 2022, directed to EP Application No. 22167844.4; 7 pages.
Extended European Search Report issued in Appln. No. 17193933.3 dated Apr. 5, 2018 (10 pages).
Fiber Optic Rotary Joint Selection Guide, known before invention (1 page).
FORJ: Miniature fiber rotary joints (MicroJx Series) from www.princetel.com, known before invention (1 page).
High Frequency Coaxial Cables; Subminiature & Miniature Coaxial Cables, p. 34, known before invention (1 page).
How to mount fiber optic rotary joints from www.princetel.com, known before invention (5 pages).
Intention to Grant dated Mar. 23, 2021, directed to EP Application No. 17 193 933.3; 7 pages.
Intention to Grant dated Oct. 26, 2021, directed to EP Application No. 17 193 933.3; 7 pages.
Model MJX Single-Channel FORJ and Model RFCX Single-Channel FORJ from www.Erincetel.com, known before invention (1 page).
RS-232 Article, known before invention (1 page).
RS-485 Article, pp. 1-6, known before invention (6 pages).
Serial Communication Article, pp. 1-4, known before invention (4 pages).
Standards Article, known before invention (1 page).
Tutorial: Electric Slip Rings from www.princetel.com, known before invention (7 pages).
Tutorial: Fiberoptic rotary joint from www.princetel.com, known before invention (4 pages).
Tutorial: FORJ frequently asked questions from www.princetel.com, known before invention (5 pages).
Tutorial: Wavelength Division Multiplexing and Directional Multiplexing from www.princetel.com, known before invention (4 pages).
Twisted Pair Article, pp. 1-8, known before invention (8 pages).

* cited by examiner

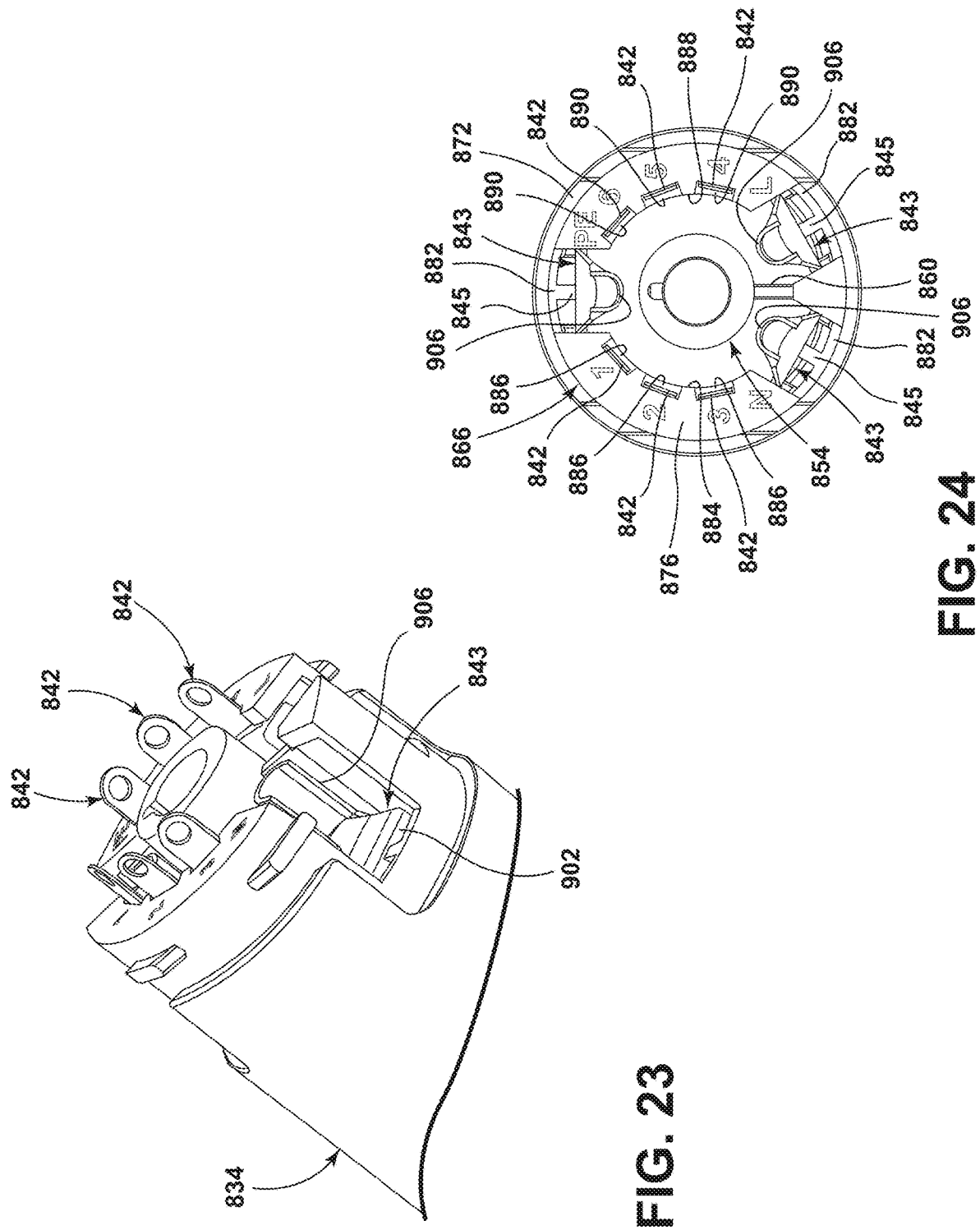

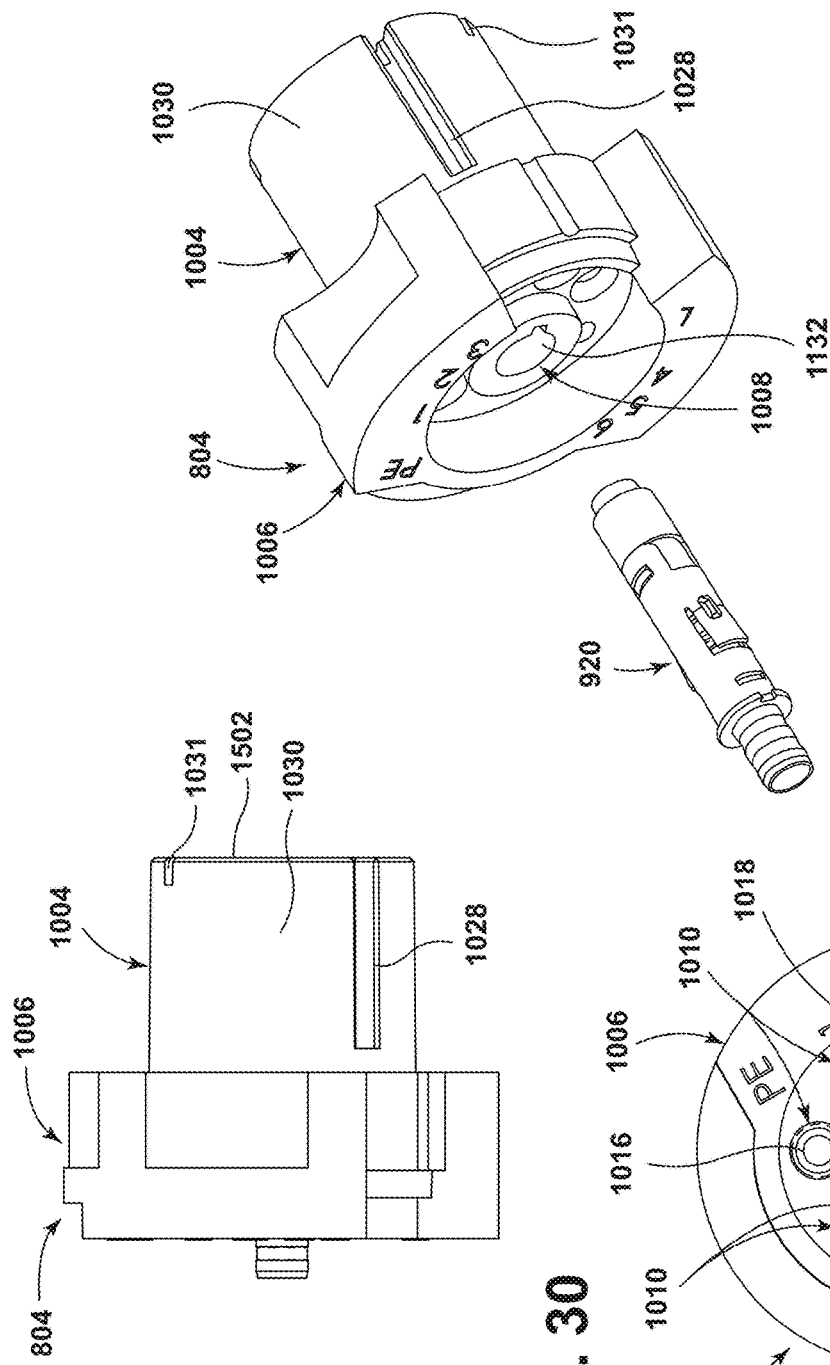

SEPARABLE INFINITE ROTATION FIBER OPTIC AND SLIP RING ROTARY JOINT FOR SUSPENSION ARM

CROSS-REFERENCE TO RELATED APPLICATIONS

This application is a continuation of U.S. patent application Ser. No. 16/877,306, filed May 18, 2020 (now U.S. Publication No. 2021-0003785-A1), which is a continuation of U.S. patent application Ser. No. 15/645,081 (now U.S. Pat. No. 10,656,341 issued May 19, 2020), filed Jul. 10, 2017, which claims the benefit of U.S. Provisional Application No. 62/361,301, filed Jul. 12, 2016, the entire contents of each of which are incorporated by reference herein.

FIELD OF THE INVENTION

The present invention relates to a joint, and in particular to a separable infinite rotation fiber optic and slip ring joint that can be used in medical devices.

BACKGROUND OF THE INVENTION

Surgical monitors have been used in operating rooms to provide images to surgeons in the room. Likewise, other wired devices, such as surgical lights, speakers, joysticks, keyboards and cameras, have been used in operating rooms to provide surgical information to a surgeon or other person in the operating room (e.g., images from a camera or patient vital information). Such devices receive and/or provide signals and power to and/or from various supports mounted or provided in the operating room, thereby requiring wiring to extend through supports for such devices to the devices. Such wiring arrangements have necessitated that the rotation of joints of the supports be limited (e.g., using stops to limit rotation) to allow the wiring to extend fully through the supports without subjecting the wiring to excessive and damaging twisting of the wiring. Alternatively, if the rotation of the joints allowed for a larger range of rotation, such arrangements do not allow for a large data transfer rate through the supports to the devices. Thus, there is a need for accommodating wiring in a way which will allow for a large data transfer rate while simultaneously allowing the supports to be fully and easily adjustable.

SUMMARY OF THE INVENTION

The present invention, according to one aspect, is directed to a medical suspension arm assembly including a plurality of suspension arms, with each adjacent pair of the suspension arms being connected to each other by a joint and with at least one of the joints comprising an infinite rotation joint. The infinite rotation joint allows the suspension arms at the infinite rotation joint to have unlimited rotation relative to one another. Cabling including at least one fiber optic cable extends through each of the suspension arms and each joint. A wired medical unit is connected to an end of the plurality of suspension arms. High definition video, data and power can be transferred along each one of the suspension arms through the cabling and across each joint. The infinite rotation joint can be separable and can automatically form a unit when adjacent arms are connected together.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

FIG. 23 is a perspective end view of the stator of the separable infinite rotation fiber optic and slip ring joint according to the present invention.

FIG. 24 is an end view of the stator of the separable infinite rotation fiber optic and slip ring joint according to the present invention.

FIG. 30 is a side view of a rotor connector of the rotor and the second optical connector of the separable infinite rotation fiber optic and slip ring joint according to the present invention.

FIG. 31 is an exploded perspective view of the rotor connector of the rotor and the second optical connector of the separable infinite rotation fiber optic and slip ring joint according to the present invention.

FIG. 32 is an end view of the rotor connector of the rotor and the second optical connector of the separable infinite rotation fiber optic and slip ring joint according to the present invention.

Figure 1:
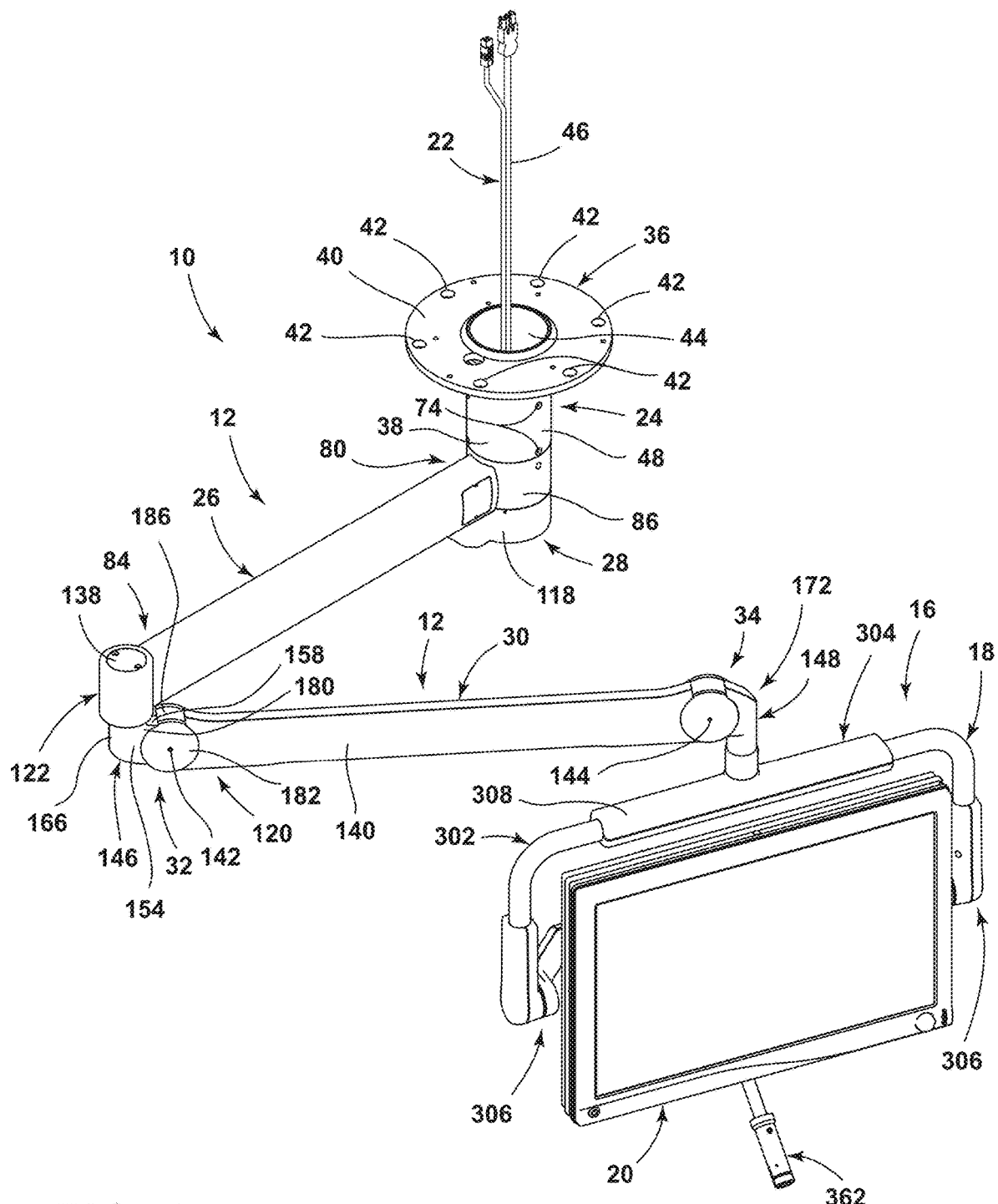
FIG. 1 illustrates a perspective view of a suspension arm assembly according to the present invention.

The specific devices and processes illustrated in the attached drawings, and described in the following specification are simply exemplary embodiments of the inventive concepts. Hence, specific dimensions and other physical characteristics relating to the embodiments disclosed herein are not to be considered as limiting.

DETAILED DESCRIPTION

The reference number 10 (FIGS. 1-4) generally designates a suspension arm assembly of the present invention. The suspension arm assembly 10 includes a ceiling attachment member 24, a wired medical unit 16 and a plurality of arms 12 between the ceiling attachment member 24 and the wired medical unit 16. The intersections between one of the arms 12 and the ceiling attachment member 24, each of the arms 12, and one of the arms 12 and the wired medical unit 16 allow for infinite rotation. Each intersection also includes an infinite rotation fiber optic and slip ring joint 14 (see FIGS. 3 and 4) therein. A cabling system 22 transmits data and power through the suspension arm assembly 10 to the wired medical unit 16 and the infinite rotation fiber optic and slip ring joints 14 allow for unlimited rotation of the arms 12 and the wired medical unit 16.

The illustrated suspension arm assembly 10 is configured to be positioned within a room (e.g., an operating room) and, in the illustrated embodiment, includes the wired medical unit 16, which is configured to provide information to the medical personnel in the room and/or to assist the medical personnel in the room perform various functions. In the illustrated example, the wired medical unit 16 includes a display support assembly 18 at a distal end of one of the arms 12 for supporting a display monitor 20 for providing surgical information to a surgeon or other person in the operating room (e.g., images from a camera (e.g., an in-light camera or an endoscopic camera) or patient vital information). It is contemplated that other items (e.g., surgical lights, dual displays, cameras, microphones, etc.) in addition to or instead of the display monitor 20 can be located at the end of the suspension arm assembly 10 such that the data stream can be from or to the item at the end of the suspension arm assembly.

In the illustrated example, the suspension arm assembly 10 is connected to a ceiling and supports the wired medical unit 16 above a support surface, such as a floor. The suspension arm assembly 10 includes the ceiling attachment member 24, a first one of the arms 12 in the form of an extension arm 26 connected to the ceiling attachment member 24 at a first infinite rotation joint 28, a second one of the arms 12 in the form of a load counterbalancing spring arm 30 connected to the extension arm 26 by a second infinite rotation joint 32, and the display support assembly 18 connected to the load counterbalancing spring arm 30 with a third infinite rotation joint 34. While the suspension arm assembly 10 is illustrated as having two arms 12, it is contemplated that the suspension arm assembly 10 could have any number of arms 12 (including only one arm 12). Furthermore, while particular configurations of infinite rotation joints having the infinite rotation fiber optic and slip ring joint 14 are described below, it is contemplated that any configuration of infinite rotation joints having the infinite rotation fiber optic and slip ring joint 14 therein could be used. Moreover, while the suspension arm assembly 10 includes the ceiling attachment member 24 for connecting the suspension arm assembly 10 to a ceiling, it is contemplated that the ceiling attachment member 24 could be used to connect the suspension arm assembly 10 to any structure (fixed or movable) above a support surface, such as a floor.

The illustrated ceiling attachment member 24 accepts the cabling system 22 therein and supports the suspension arm assembly 10 from the ceiling of a room. The ceiling attachment member 24 includes a ceiling attachment flange 36 and a down tube 38. The ceiling attachment flange 36 can have any configuration for connecting to a ceiling support structure. In the illustrated embodiment, the ceiling attachment flange 36 is a flat circular disc 40 having a plurality of holes 42 therein configured to receive fasteners (not shown) for fixedly connecting the flat circular disc 40 to the ceiling support structure. The flat circular disc 40 includes a central opening 44 receiving a first section 46 of the cabling system 22 therethrough. The down tube 38 includes a down cylinder 48 being co-axial with the central opening 44 in the flat circular disc 40 of the ceiling attachment flange 36. The down tube 38 can have any axial length to adjust for various heights of ceilings in the room. The ceiling attachment member 24 further includes a central axis spindle 50 for connecting the down tube 38 to the extension arm 26.

Figure 5:
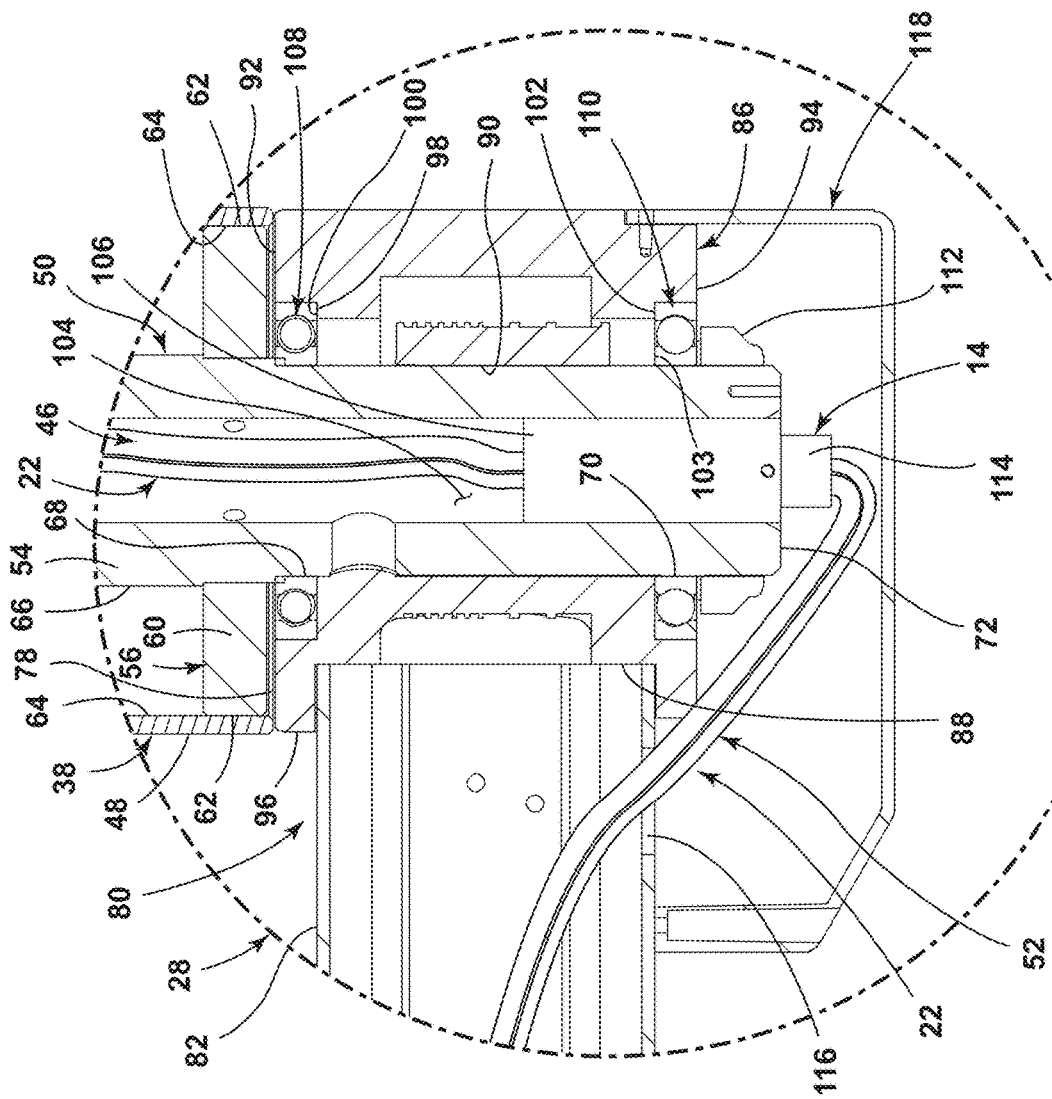
FIG. 5 is an enlarged cross-sectional view of a first infinite rotation joint of the suspension arm assembly according to the present invention taken from the circle V of FIG. 4.

In the illustrated example, the central axis spindle 50 allows for infinite rotation of the extension arm 26 about the ceiling attachment member 24 and houses one of the infinite rotation fiber optic and slip ring joints 14 therein connecting the first section 46 of the cabling system 22 to a second section 52 of the cabling system 22. The central axis spindle 50 includes an axis cylinder 54 having a pair of down tube mounting flanges 56 including an upper disc 58 and a lower disc 60. The upper disc 58 surrounds a top edge of the axis cylinder 54 and the lower disc 60 surrounds a central area of the axis cylinder 54. The upper disc 58 and the lower disc 60 have the same outer diameter corresponding to the inner diameter of the down cylinder 48 of the down tube 38 and have outer surfaces 62 which are aligned with one another such that the upper disc 58 and the lower disc 60 abut against an inner surface 64 of the down cylinder 48 of the down tube 38 (see FIG. 5). Fasteners (not shown) extend through aligned openings 74 in the down cylinder 48 and into openings 76 in the outer alignment surfaces 62 of the upper disc 58 and the lower disc 60 to fixedly connect the down cylinder 48 to the central axis spindle 50. As illustrated in FIG. 5, the lower disc 60 closes a bottom open end 78 of the down cylinder 48. An outer surface 66 of the axis cylinder 54 includes an upper bearing receiving area 68 located directly below the lower disc 60 and a lower bearing receiving area 70 located adjacent but spaced from a bottom edge 72 of the axis cylinder 54. The axis cylinder 54 also includes a bearing receiving surface below the lower bearing receiving area 70. The axis cylinder 54 receives the infinite rotation fiber optic and slip ring joint 14 therein and is received in a proximal end 80 of the extension arm 26.

The illustrated extension arm 26 is connected to the ceiling attachment member 24 at the first infinite rotation joint 28. The extension arm 26 includes a hollow tube 82 having the proximal end 80 connected to the ceiling attachment member 24 at the first infinite rotation joint 28 and a distal end 84 connected to the load counterbalancing spring arm 30 at the second infinite rotation joint 32. As illustrated in FIG. 5, the proximal end 80 of the extension arm 26 includes a spindle receiving block 86 receiving the central axis spindle 50 therein. The spindle receiving block 86 includes a side tube receiving counterbore 88 in a side face 96 thereof receiving an end of the hollow tube 82 therein for fixedly connecting the hollow tube 82 to the spindle receiving block 86. The spindle receiving block 86 further includes a central spindle receiving circular hole 90 that extends through the spindle receiving block 86 from a top surface 92 to a bottom surface 94 thereof. An upper bearing ring receiving counter bore 98 in the top surface 92 of the spindle receiving block 86 surrounds the central spindle receiving circular hole 90 to form a top step surface 100 located below the top surface 92. Likewise, a lower bearing ring receiving counter bore 102 in the bottom surface 94 of the spindle receiving block 86 surrounds the central spindle receiving circular hole 90 to form a bottom step surface 103 located above the bottom surface 94. In the illustrated example, the spindle receiving block 86 has a circular cross-section. However, it is contemplated that the spindle receiving block 86 could have any exterior shape.

In the illustrated example, the central axis spindle 50 is inserted into the spindle receiving block 86 of the extension arm 26 to allow the extension arm 26 to rotate about the axis cylinder 54 of the central axis spindle 50. During assembly of the suspension arm assembly 10, one of the infinite rotation fiber optic and slip ring joints 14 is connected to the first section 46 of the cabling system 22 (as discussed in more detail below) and inserted into an interior 104 of the axis cylinder 54 through the bottom edge 72 of the axis cylinder 54. A stator 106 of the infinite rotation fiber optic and slip ring joint 14 is then fixed to the axis cylinder 54 by fasteners (or any other connection method) such that the stator 106 of the infinite rotation fiber optic and slip ring joint 14 at the first infinite rotation joint 28 remains stationary relative to the room.

Figure 2:
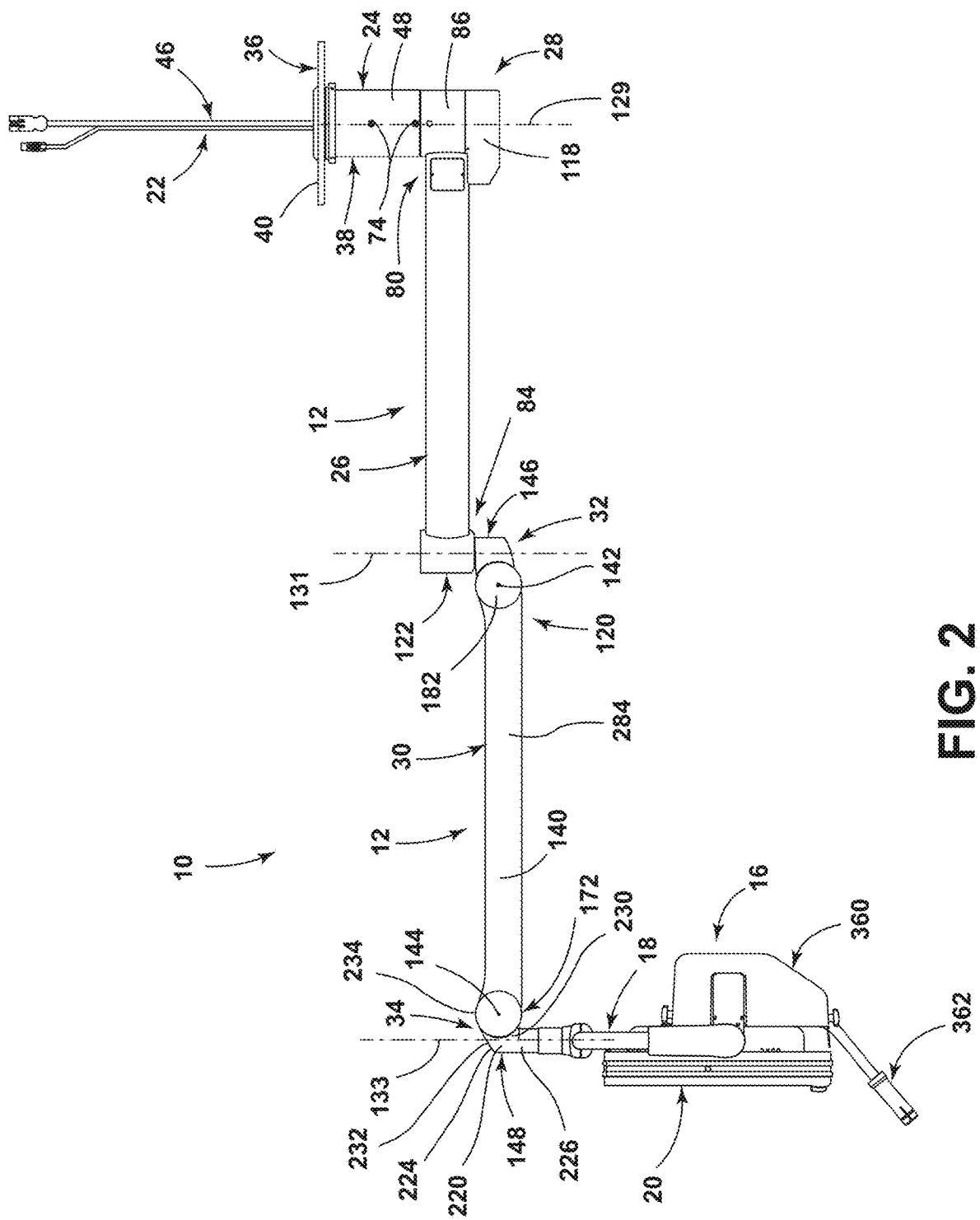
FIG. 2 is a side view of the suspension arm assembly according to the present invention.
Figure 3:
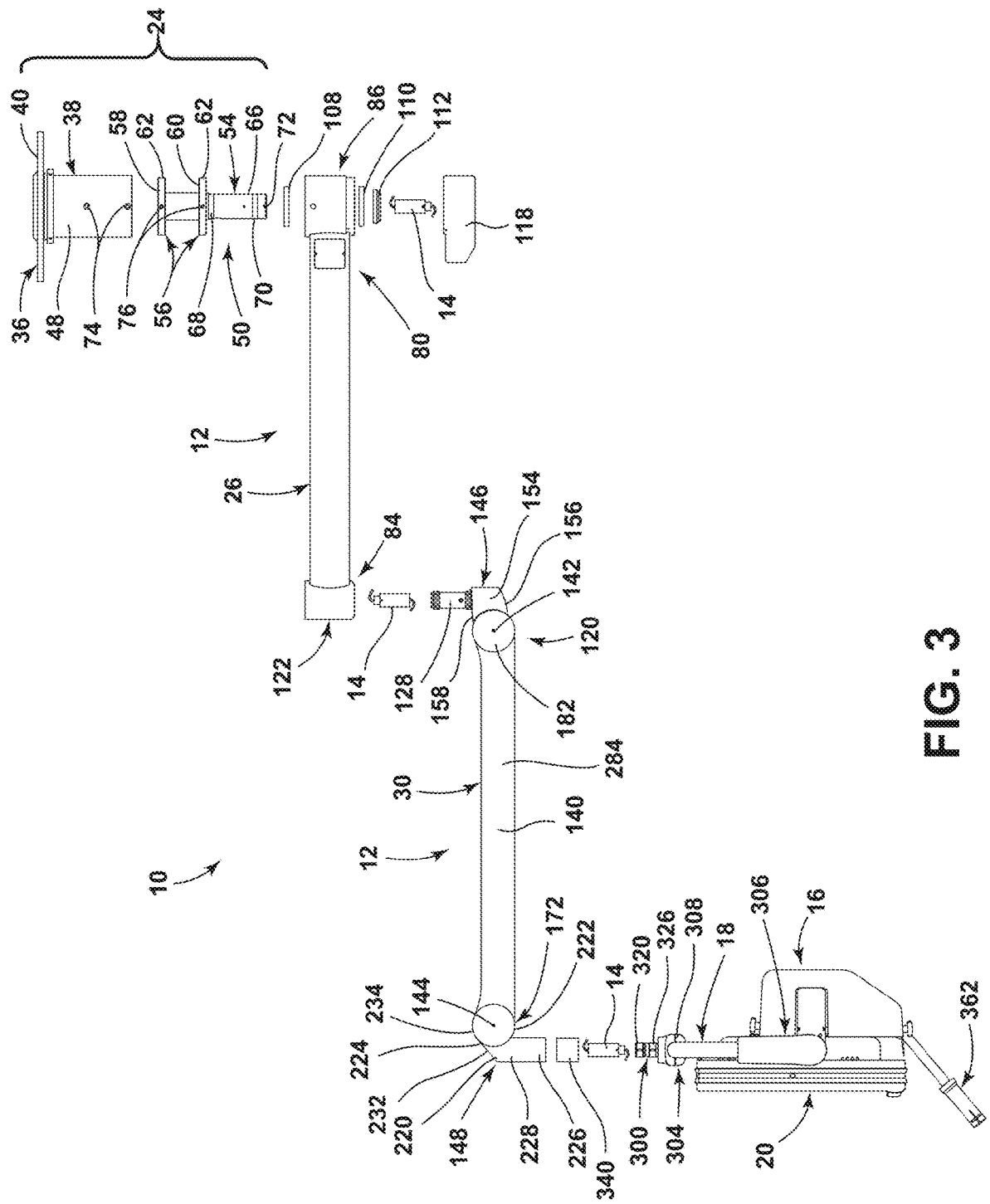
FIG. 3 is an exploded side view of the suspension arm assembly according to the present invention.

As illustrated in FIGS. 2 and 5, a first bearing ring 108 and a second bearing ring 110 allow the extension arm 26 to rotate relative to the ceiling attachment member 24 about a first vertical axis 129. The first bearing ring 108 surrounds the axis cylinder 54 at the upper bearing receiving area 68, with the lower disc 60 of the central axis spindle 50 resting on the first bearing ring 108. The first bearing ring 108 is located within the upper bearing ring receiving counter bore 98 in the top surface 92 of the spindle receiving block 86 and rides on the top step surface 100. The second bearing ring 110 surrounds the axis cylinder 54 at the lower bearing receiving area 70. The second bearing ring 110 is located within the lower bearing ring receiving counter bore 102 in the bottom surface 94 of the spindle receiving block 86, with the bottom step 103 resting on the second bearing ring 110. A disc shaped spanner nut 112 is connected to an end of the axis cylinder 54 (e.g., by being threaded onto the axis cylinder 54) to hold the second bearing ring 110 on the end of the axis cylinder 54. The disc shaped spanner nut 112 also compresses the second bearing ring 110 between the bottom step 103 of the lower bearing ring receiving counter bore 102 and the disc shaped spanner nut 112 such that the second bearing ring 110 rides on the disc shaped spanner nut 112. The disc shaped spanner nut 112 thereby ensures that the extension arm 26 is securely connected to the ceiling attachment member 24 to allow the extension arm 26 to rotate about the ceiling attachment member 24 in a stable manner.

In the illustrated example, a rotor 114 of the infinite rotation fiber optic and slip ring joint 14 is allowed to rotate relative to the stator 106 of the infinite rotation fiber optic and slip ring joint 14 and is connected to the second section 52 of the cabling system 22. Therefore, the rotor 114 of the infinite rotation fiber optic and slip ring joint 14 at the first infinite rotation joint 28 and the second section 52 of the cabling system 22 are able to rotate with rotation of the extension arm 26 about the ceiling attachment member 24. As illustrated in FIG. 5, the second section 52 of the cabling system 22 enters the hollow tube 82 of the extension arm 26 through a cabling entrance 116 in the hollow tube 82 adjacent the spindle receiving block 86 at the proximal end 80 of the extension arm 26. A cosmetic and protective cover 118 covers a bottom of the proximal end 80 of the extension arm 26, with the cosmetic and protective cover 118 being connected to a bottom of the hollow tube 82 in order to cover the cabling entrance 116 and also being connected to a bottom of the spindle receiving block 86 to protect a bottom of the spindle receiving block 86, the infinite rotation fiber optic and slip ring joint 14 at the first infinite rotation joint 28, the disc shaped spanner nut 112, and the central axis spindle 50. The cosmetic and protective cover 118 protects the second section 52 of the cabling system 22 connected to the infinite rotation fiber optic and slip ring joint 14 at the first infinite rotation joint 28 and hides the second section 52 of the cabling system 22 from exposure.

Figure 6:
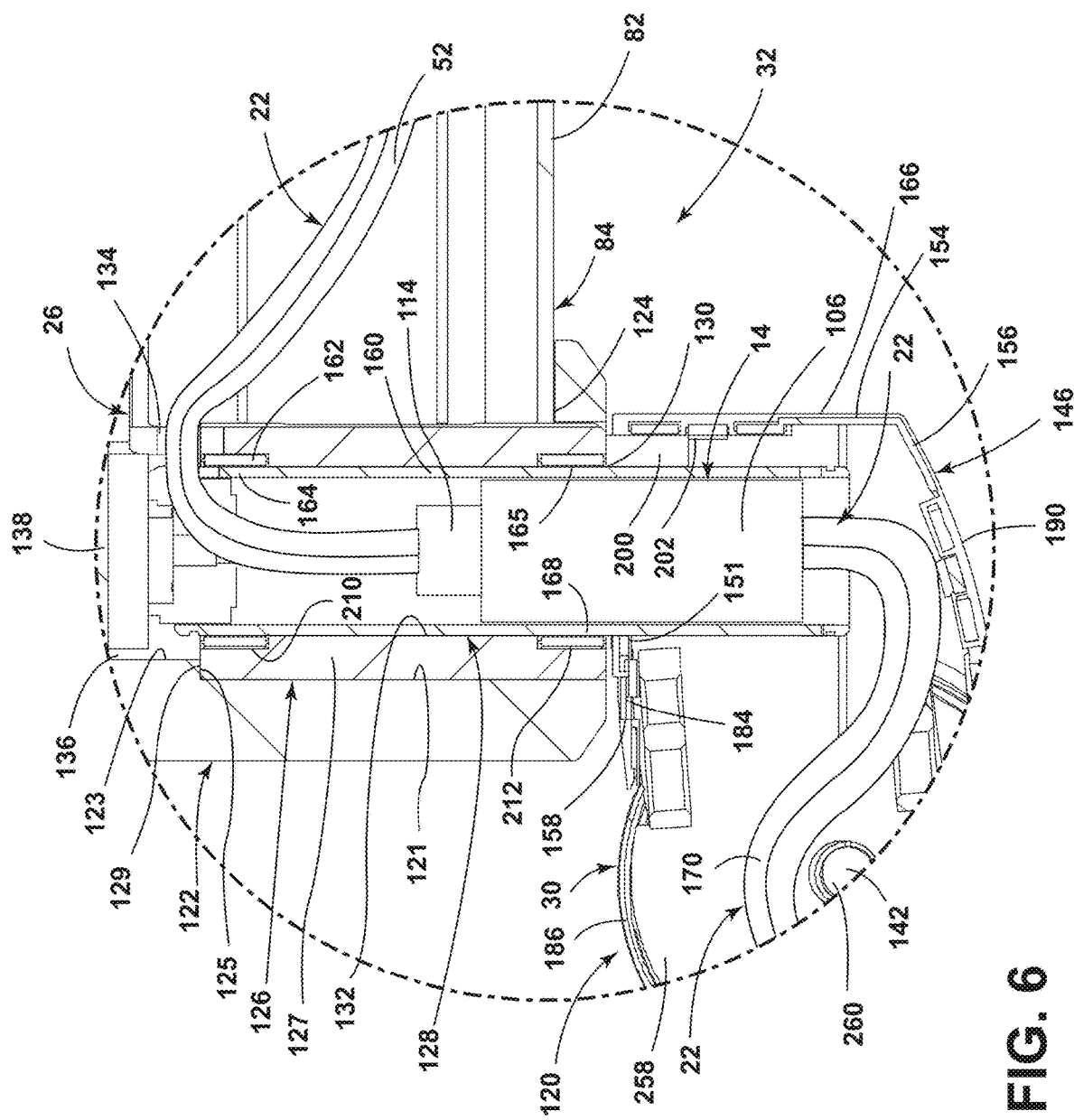
FIG. 6 is an enlarged cross-sectional view of a second infinite rotation joint of the suspension arm assembly according to the present invention taken from the circle VI of FIG. 4.

The illustrated second section 52 of the cabling system 22 extends through the extension arm 26 and is connected to a second one of the infinite rotation fiber optic and slip ring joints 14 at the second infinite rotation joint 32. The second infinite rotation joint 32 includes an intersection of the extension arm 26 at the distal end 84 thereof and a proximal end 120 of the load counterbalancing spring arm 30. The illustrated extension arm 26 includes a circular pivot tube receiving block 122 at the distal end 84 thereof, with the circular pivot tube receiving block 122 being connected to the hollow tube 82 of the extension arm 26. The circular pivot tube receiving block 122 includes a side tube receiving bore 124 receiving the hollow tube 82 therein for fixing the hollow tube 82 to the circular pivot tube receiving block 122. As illustrated in FIG. 6, the circular pivot tube receiving block 122 includes a stepped vertically oriented circular bearing tube receiving hole 126 extending therethrough. The stepped vertically oriented circular bearing tube receiving hole 126 includes a smaller diameter lower portion 121, a larger diameter upper portion 123 and a step 125 between the smaller diameter lower portion 121 and the larger diameter upper portion 123. A tubular sleeve 127 is located in the smaller diameter lower portion 121 and a top surface 129 of the tubular sleeve 127 abuts the step 125. As illustrated in FIG. 6, the hollow tube 82 is inserted into the side tube receiving bore 124 until the hollow tube 82 abuts the exterior surface of the tubular sleeve 127.

In the illustrated example, the tubular sleeve 127 is configured to receive a bearing tube 128 of the load counterbalancing spring arm 30 therein for connecting the load counterbalancing spring arm 30 to the extension arm 26. An interior surface of the tubular sleeve 127 defines a circular inner bearing surface 132 within the circular pivot tube receiving block 122. As illustrated in FIG. 6, an access area 134 is located in the circular pivot tube receiving block 122 above the tubular sleeve 127 for allowing the second section 52 of the cabling system 22 to pass from the hollow tube 82 and into the circular pivot tube receiving block 122. It is contemplated that the circular pivot tube receiving block 122 could have an open top 136 covered by a removable cover 138. The tubular sleeve 127 has an open bottom area 130 for receiving the bearing tube 128 of the load counterbalancing spring arm 30 therein.

The illustrated load counterbalancing spring arm 30 is configured to rotate about a second vertical axis 131 at the second infinite rotation joint 32 and a third vertical axis 133 at the third infinite rotation joint 34 (see FIG. 2). The load counterbalancing spring arm 30 is also configured to allow the third infinite rotation joint 34 to move vertically relative to the second infinite rotation joint 32. The load counterbalancing spring arm 30 includes a proximal knuckle member 146, a central member 140 and a distal knuckle member 148. The proximal knuckle member 146 has the bearing tube 128 extending therefrom for connecting the proximal knuckle member 146, and thereby the load counterbalancing spring arm 30, to the extension arm 26. The proximal knuckle member 146 also includes the second vertical axis 131 extending therethrough. The proximal knuckle member 146 is pivotally connected to the central member 140 to allow the central member 140 to pivot about a first horizontal axis 142. The central member 140 is also pivotally connected to the distal knuckle member 148 to allow the central member 140 to pivot about a second horizontal axis 144. The distal knuckle member 148 also includes the third vertical axis 133 extending therethrough. The distal knuckle member 148 is connected to the wired medical unit 16 as discussed in more detail below.

In the illustrated example, the proximal knuckle member 146 has the bearing tube 128 extending therefrom for connecting the proximal knuckle member 146 to the extension arm 26. The proximal knuckle member 146 includes a U-shaped side wall 154, a bottom wall 156 and a top wall 158, with the bearing tube 128 extending through an opening 151 in the top wall 158. The U-shaped side wall 154 includes a curved wall section 166 below the circular pivot tube receiving block 122 and a pair of stepped side wall sections 180 extending from the curved wall section 166 to define an open end opposite the curved wall section 166. Each of the stepped side wall sections 180 include a circular recessed area at a terminal end thereof for accepting disc projections 182 of the central member 140 as discussed in more detail below. The top wall 158 includes a substantially flat portion 184 connected to a top of the U-shaped side wall 154 and an arcuate portion 186 connected to the top of the circular recessed areas of the U-shaped side wall 154. The bottom wall 156 includes a curved section 190 connected to a bottom of the U-shaped side wall 154 and an arcuate portion 192 connected to the bottom of the circular recessed areas of the U-shaped side wall 154. As illustrated in FIG. 6, the bearing tube 128 extends upwardly out of the opening 151 in the flat portion 184 of the top wall 158 and directly into the tubular sleeve 127 of the circular pivot tube receiving block 122. A fixing projection 200 extends from an inside face 202 of the U-shaped side wall 154 to connect the bearing tube 128 to the proximal knuckle member 146.

The illustrated bearing tube 128 of the load counterbalancing spring arm 30 is inserted into the open bottom area 130 of the tubular sleeve 127 of the circular pivot tube receiving block 122 of the extension arm 26 to connect the load counterbalancing spring arm 30 to the extension arm 26. The bearing tube 128 includes a bearing cylinder 160, an upper bearing ring 162 connected to an upper area 164 of the bearing cylinder 160 and a middle bearing ring 165 connected to a middle area 168 of the bearing cylinder 160 directly above the top wall 158 of the proximal knuckle member 146. The tubular sleeve 127 includes an upper circular recess 210 receiving the upper bearing ring 162 therein and a lower circular recess 212 receiving the middle bearing ring 165 therein for allowing the bearing tube 128, and thereby the load counterbalancing spring arm 30, to rotate relative to the extension arm 26. The wired medical unit 16 is thereby allowed to rotate about the second vertical axis 131 at the second infinite rotation joint 32.

In the illustrated example, one of the infinite rotation fiber optic and slip ring joints 14 at the second infinite rotation joint 32 is connected to the second section 52 of the cabling system 22 and a third section 170 of the cabling system 22 extending through the load counterbalancing spring arm 30 as discussed in more detail below. The stator 106 of the infinite rotation fiber optic and slip ring joint 14 at the second infinite rotation joint 32 is fixed to the bearing tube 128 by fasteners (or any other connection method) such that the stator 106 of the infinite rotation fiber optic and slip ring joint 14 at the second infinite rotation joint 32 is stationary relative to the load counterbalancing spring arm 30. Likewise, the rotor 114 of the infinite rotation fiber optic and slip ring joint 14 at the second infinite rotation joint 32 is allowed to rotate relative to the stator 106.

Figure 4:
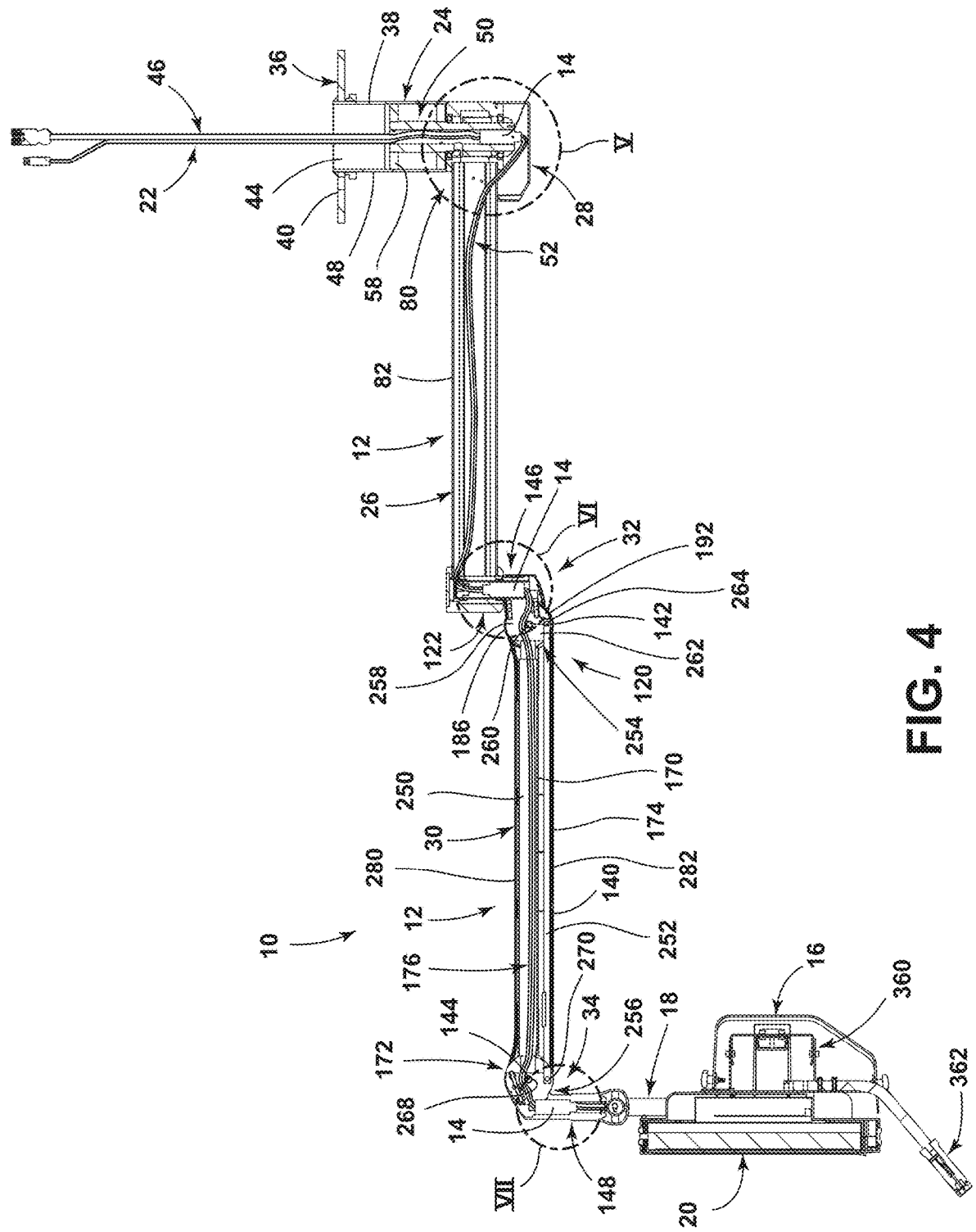
FIG. 4 is a cross-sectional view of the suspension arm assembly according to the present invention.
Figure 7:
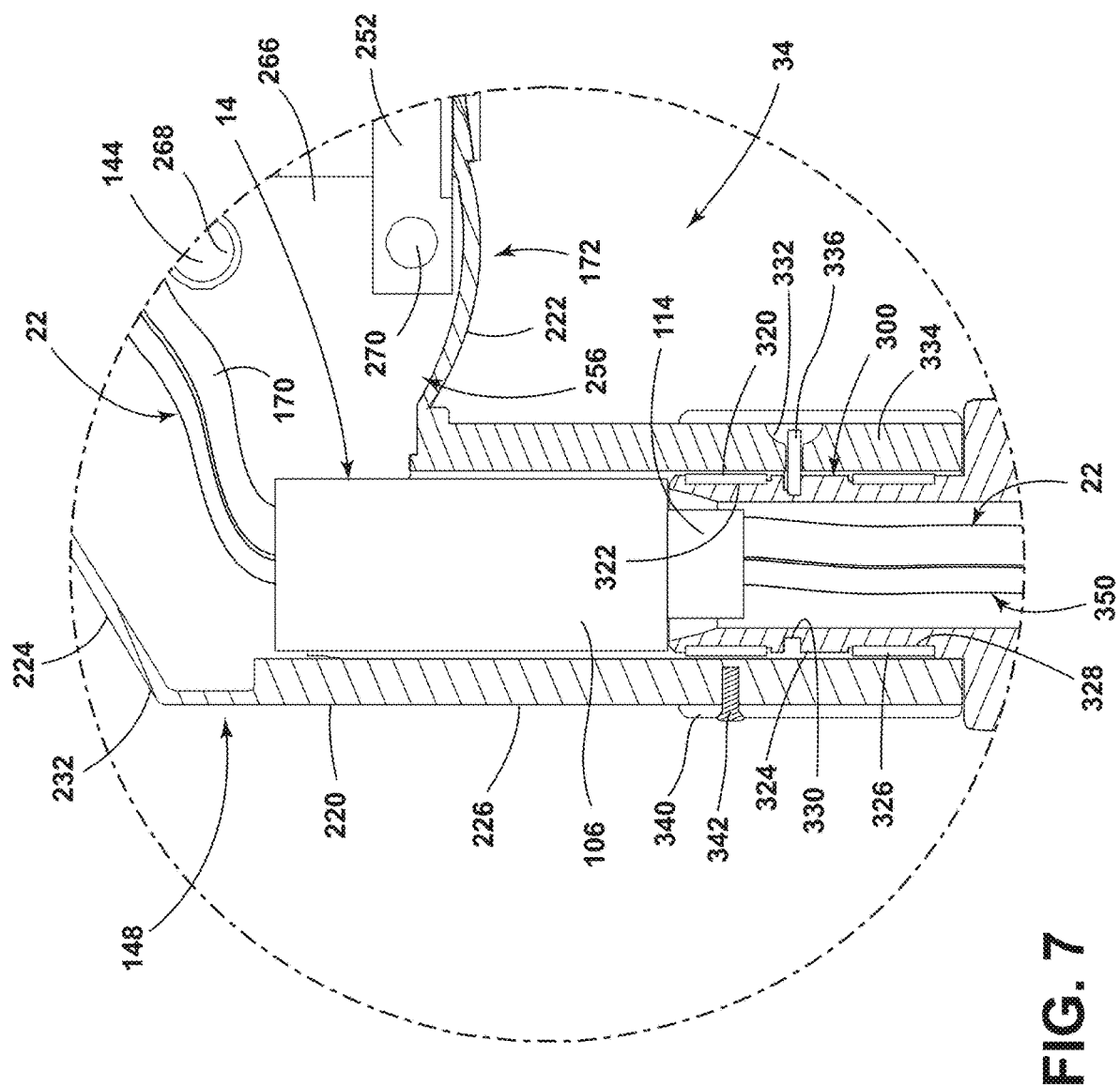
FIG. 7 is an enlarged cross-sectional view of a third infinite rotation joint of the suspension arm assembly according to the present invention taken from the circle VII of FIG. 4.

As illustrated in FIGS. 4, 6 and 7, the third section 170 of the cabling system 22 extends through the central member 140 of the load counterbalancing spring arm 30 and is connected to a third one of the infinite rotation fiber optic and slip ring joints 14 at the third infinite rotation joint 34. The third infinite rotation joint 34 includes an intersection of the load counterbalancing spring arm 30 at the distal end 172 thereof and the wired medical unit 16. The central member 140 of the load counterbalancing spring arm 30 is pivotally connected to the proximal knuckle member 146 at the first horizontal axis 142 to allow the wired medical unit 16 to rotate about the first horizontal axis 142. The central member 140 is also pivotally connected to the distal knuckle member 148 at the second horizontal axis 144 to allow the wired medical unit 16 to rotate about the second horizontal axis 144.

The illustrated load counterbalancing spring arm 30 is configured to have the central member 140 rotate simultaneously about the proximal knuckle member 146 and the distal knuckle member 148. The central member 140 includes an outer shell 174 having a substantially rectangular cross-sectional shape. A parallel pair of the disc projections 182 extends from each end of the outer shell 174. A parallelogram connection assembly 176 extends through the outer shell 174 and is connected to both the proximal knuckle member 146 and the distal knuckle member 148 to allow the central member 140 to rotate simultaneously about the proximal knuckle member 146 and the distal knuckle member 148.

In the illustrated example, the distal knuckle member 148 connects the load counterbalancing spring arm 30 to the wired medical unit 16. The distal knuckle member 148 includes a U-shaped side wall 220, a bottom wall 222 and a top wall 224, with a down tube 226 extending downwardly from the bottom wall 222 for connection to the display support assembly 18 of the wired medical unit 16. The U-shaped side wall 220 includes a curved wall section 228 coextensive with the down tube 226 and a pair of stepped side wall sections 230 extending from the curved wall section 228 to define an open end opposite the curved wall section 228. Each of the stepped side wall sections 230 include a circular recessed area at a terminal end thereof for accepting disc projections 182 of the central member 140 as discussed in more detail below. The top wall 224 includes an angled portion 232 connected to a top of the U-shaped side wall 220 and an arcuate portion 234 connected to the top of the circular recessed areas of the U-shaped side wall 220. The bottom wall 222 is arcuate and is connected to a bottom of the U-shaped side wall 220.

The illustrated parallelogram connection assembly 176 extends between and is connected to the proximal knuckle member 146 and the distal knuckle member 148. The parallelogram connection assembly 176 includes an upper rod 250, a lower rod 252, a proximal knuckle connection 254 and a distal knuckle connection 256. The proximal knuckle connection 254 includes a pair of parallel plates 258 extending between the arcuate portion 186 of the top wall 158 and the arcuate portion 192 of the bottom wall 156 of the proximal knuckle member 146. The upper rod 250 is located between the parallel plates 258 and pivotally connected thereto by a pivot pin 260 located at the first horizontal axis 142 to allow the upper rod 250 to pivot about the first horizontal axis 142. The lower rod 252 is pivotally connected to an outside face 262 of one of the parallel plates 258 by a pivot pin 264. Like the proximal knuckle connection 254, the distal knuckle connection 256 includes a pair of parallel plates 266 extending between the arcuate portion 234 of the top wall 224 and the bottom wall 222 of the distal knuckle member 148. The upper rod 250 is located between the parallel plates 266 and pivotally connected thereto by a pivot pin 268 located at the second horizontal axis 144 to allow the upper rod 250 to pivot about the second horizontal axis 144. The lower rod 252 is pivotally connected to an outside face 262 of one of the parallel plates 266 by a pivot pin 270.

In the illustrated example, the parallelogram connection assembly 176 allows the second horizontal axis 144 to move vertically relative to the first horizontal axis 142. As the distal knuckle member 148 is lowered, the upper rod 250 will pivot about the pivot pin 260 located at the first horizontal axis 142, which will also force the lower rod 252 to pivot about the pivot pin 264 at the proximal knuckle member 146. Because the upper rod 250 and the lower rod 252 of the parallelogram connection assembly 176 form a parallelogram with the parallel plates 258 in the proximal knuckle member 146 and the parallel plates 266 in the distal knuckle member 148, the distal knuckle member 148 will not rotate as the distal knuckle member 148 is lowered (that is, a line between the pivot pin 260 and the pivot pin 264 in the proximal knuckle member 146 will remain substantially parallel to a line between the pivot pin 268 and the pivot pin 268 in the distal knuckle member 148, with both lines remaining substantially vertical). As is well known to those skilled in the art, a spring can be located within the central member 140 (e.g., partially surrounding the upper rod 250) to maintain the parallelogram connection assembly 176 in a selected rotated position.

The illustrated central member 140 covers the pivot areas of the load counterbalancing spring arm 30. The outer shell 174 of the central member 140 includes a top wall 280 that rides on the arcuate portion 186 of the top wall 158 of the proximal knuckle member 146 and the arcuate portion 234 of the top wall 224 and the bottom wall 222 of the distal knuckle member 148 during lowering and raising of the load counterbalancing spring arm 30. Likewise, the outer shell 174 of the central member 140 includes a bottom wall 282 that rides on the arcuate portion 192 of the bottom wall 156 of the proximal knuckle member 146 and the bottom wall 222 of the distal knuckle member 148 during lowering and raising of the load counterbalancing spring arm 30. Each end of the side walls 284 of the outer shell 174 of the central member 140 have one of the disc projections 182 extending therefrom. The disc projections 182 cover the circular recessed area at the terminal ends of the stepped side wall sections 180 of the U-shaped side wall 154 of the proximal knuckle member 146 to form a cosmetic joint. The disc projections 182 also cover the circular recessed area of the pair of stepped side wall sections 230 of the U-shaped side wall 220 of the distal knuckle member 148 to form a cosmetic joint.

In the illustrated example, the distal knuckle member 148 connects the load counterbalancing spring arm 30 to the wired medical unit 16. The down tube 226 of the distal knuckle member 148 receives a bushing cylinder 300 of the display support assembly 18 therein to connect the distal knuckle member 148, and thereby the load counterbalancing spring arm 30, to the display support assembly 18. The display support assembly 18 includes an inverted U-shaped frame member 302, an arm connection assembly 304 connected to a top of the inverted U-shaped frame member 302 and a pair of display pivot brackets 306. The arm connection assembly 304 includes a split sleeve 308 that surrounds the top of the inverted U-shaped frame member 302, with the bushing cylinder 300 extending upwardly from a center of the split sleeve 308. The bushing cylinder 300 includes an upper cylindrical bushing 320 located in an upper bushing channel 322 in an outside surface 324 of the bushing cylinder 300 and a lower cylindrical bushing 326 located in a lower bushing channel 328 in the outside surface 324 of the bushing cylinder 300. A pin slot 330 extends around the perimeter of the bushing cylinder 300 between the upper bushing channel 322 and the lower bushing channel 328.

The illustrated wired medical unit 16 is connected to the distal knuckle member 148 of the load counterbalancing spring arm 30 by inserting the bushing cylinder 300 of the display support assembly 18 into the down tube 226 of the distal knuckle member 148. As illustrated in FIG. 7, the down tube 226 of the distal knuckle member 148 has a radial pin opening 332 extending through a wall 334 of the down tube 226. When the bushing cylinder 300 of the display support assembly 18 is fully inserted into the down tube 226 of the distal knuckle member 148, the radial pin opening 332 in the wall 334 of the down tube 226 is aligned with the pin slot 330 in the bushing cylinder 300. A yoke retaining clip 336 extends through the radial pin opening 332 and into the pin slot 330 in the bushing cylinder 300 to connect the wired medical unit 16 to the distal knuckle member 148. The yoke retaining clip 336 also allows the wired medical unit 16 to rotate about the distal knuckle member 148 at the third vertical axis 133. Once the yoke retaining clip 336 is inserted into the radial pin opening 332 and the pin slot 330, a cylindrical retaining clip sleeve 340 surrounding the down tube 226 is slid downward to cover the radial pin opening 332 in the wall 334 of the down tube 226 to lock the yoke retaining clip 336 in position. A fastener 342 can be inserted through the cylindrical retaining clip sleeve 340 and into the down tube 226 to lock the cylindrical retaining clip sleeve 340 in position.

In the illustrated example, one of the infinite rotation fiber optic and slip ring joints 14 at the third infinite rotation joint 34 is connected to the third section 170 of the cabling system 22 and a fourth section 350 of the cabling system 22 extending to the display monitor 20. The stator 106 of the infinite rotation fiber optic and slip ring joint 14 at the third infinite rotation joint 34 is fixed to the down tube 226 of the distal knuckle member 148 by fasteners (or any other connection method) such that the stator 106 of the infinite rotation fiber optic and slip ring joint 14 at the third infinite rotation joint 34 is stationary relative to the load counterbalancing spring arm 30. Likewise, the rotor 114 of the infinite rotation fiber optic and slip ring joint 14 at the third infinite rotation joint 34 is allowed to rotate relative to the stator 106.

The illustrated fourth section 350 of the cabling system 22 extends through the down tube 226 of the distal knuckle member 148 of the load counterbalancing spring arm 30, the bushing cylinder 300 of the arm connection assembly 304, the inverted U-shaped frame member 302, and to the display pivot brackets 306. As illustrated in FIGS. 1-4, the display pivot brackets 306 are connected to a display frame and cable shield 360 holding the display monitor 20 and allow the display monitor 20 to pivot about the display pivot brackets 306. The display frame and cable shield 360 can have a handle 362 to assist in positioning the display monitor 20 to a desired position. It is contemplated that the handle 362 can be removable for sterilization and/or can have a removable/replaceable sterilizable cover.

The illustrated cabling system 22 provides power and information to the wired medical unit 16 through the display support assembly 18. It is contemplated that each of the infinite rotation fiber optic and slip ring joints 14 can transmit any combination of the following: digital data through a fiber optic connection, digital or analog data through at least one coaxial cable connection, digital or analog data through at least one serial data connection, low voltage power through at least one low voltage power connection, AC power through at least one AC power connection, and a ground wire connection.

Figure 8:
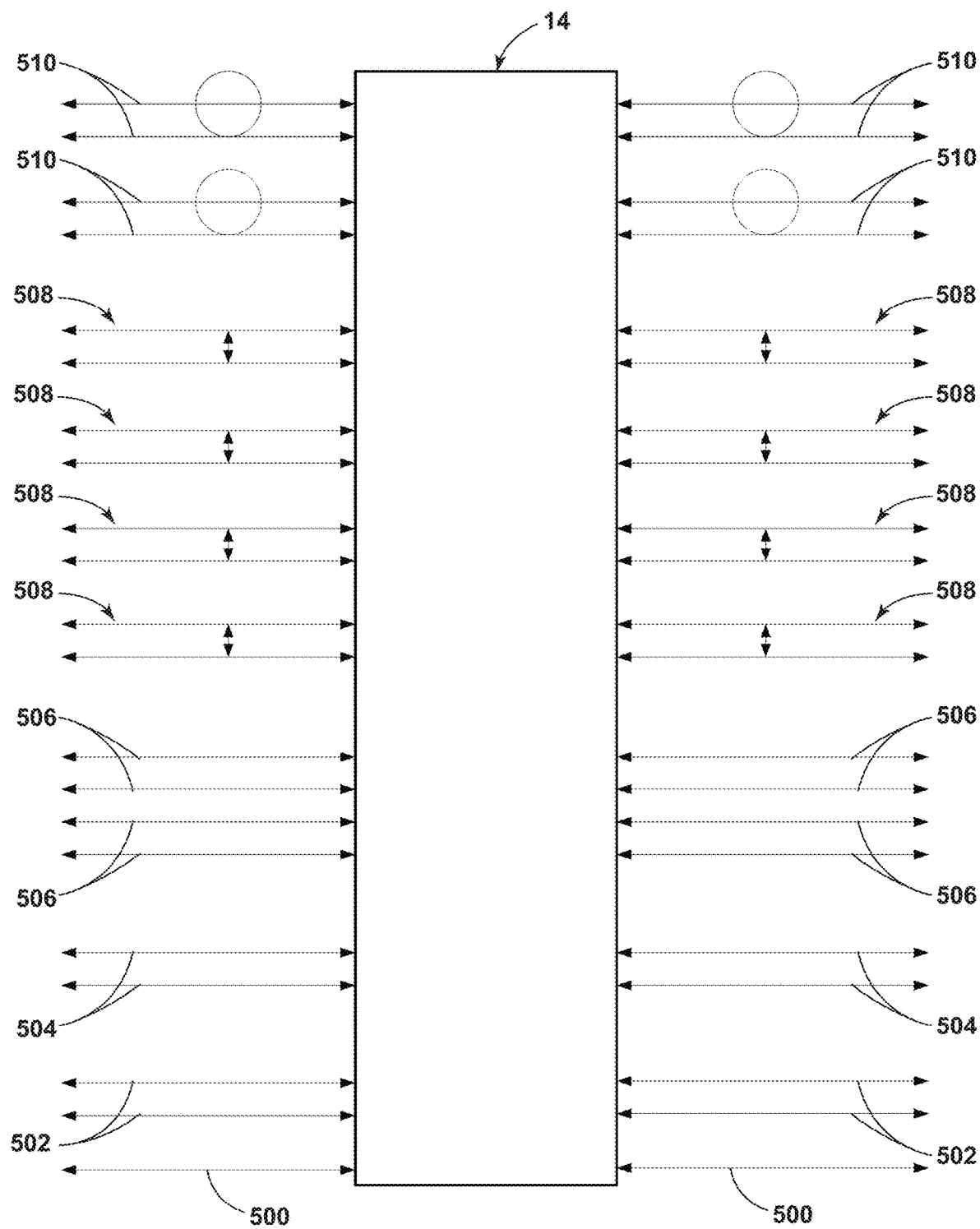
FIG. 8 is a schematic view of the data and power communications across an infinite rotation fiber optic and slip ring rotary joint according to the present invention.

FIG. 8 illustrates the power and information transmitted through the cabling system 22 and each of the infinite rotation fiber optic and slip ring joints 14 of the illustrated embodiment. The illustrated cabling system 22 includes a fiber optic cable 500 leading into and out of each infinite rotation fiber optic and slip ring joint 14, a pair of ground wires 502 leading into and out of each infinite rotation fiber optic and slip ring joint 14, a pair of AC power wires 504 leading into and out of each infinite rotation fiber optic and slip ring joint 14, four low voltage wires 506 leading into and out of each infinite rotation fiber optic and slip ring joint 14, four twisted pairs of serial data wires 508 leading into and out of each infinite rotation fiber optic and slip ring joint 14 and four coaxial cables 510 leading into and out of each infinite rotation fiber optic and slip ring joint 14. However, it is contemplated that the cabling system 22 could have more or less of the wires and cables outlined above.

The following chart lists examples of the cables and wires leading into and out of each infinite rotation fiber optic and slip ring joint 14:

| Function: | Cable type: | Size: | Type: | Volts: | Amps: | Data type: |
| --- | --- | --- | --- | --- | --- | --- |
| Video and Audio Data transmission | Fiber optic | 50 μm broadband with a 3 mm jacket | | | | HD-SDI, DVI, HDMI, any HD signals, any SD signals, Ethernet, network and other data |
| Video and Audio Data transmission | Coaxial cable | | RG-179 | 10 | 100 mA max | |
| Serial Data transmission | Serial Cable in Twisted Pairs | 26-28 AWG | | 10 | 100 mA max | RS-232, RS-485, CAN, etc. |
| Low Voltage Power | Cu or Al wire | 26-28 AWG | | 28 max | 1000 mA max | |

| Function: | Cable type: | Size: | Type: | Volts: | Amps: | Data type: |
|---|---|---|---|---|---|---|
| AC Power | Cu or Al wire | 16-18 AWG | | 120-240 VAC | 10 A | |
| Ground | Cu or Al wire | 18 AWG | | 120-240 VAC | 10 A | |

It is contemplated that the fiber optic cable 500 can be single mode or multimode and can have at least 10 Gb of bandwidth. The coaxial cables 510 can have an impedance of 75Ω and can be a coaxial cable sold as part number MOGAMI W3351 by MIT Inc. of Tokyo, Japan. The AC power wires 504 can be a power line sold as part number 3516/19 by Weico Wire & Cable Inc. of Edgewood, N.Y.

In the illustrated example, the infinite rotation fiber optic and slip ring joints 14 (FIGS. 9A-11) transmit all of the data and power through the first infinite rotation joint 28, the second infinite rotation joint 32 and the third infinite rotation joint 34. The infinite rotation fiber optic and slip ring joint 14 includes a slip ring housing 520 and a fiber optic rotary joint 522 within the slip ring housing 520. The slip ring housing 520 includes the rotor 114 and the stator 106. The stator 106 includes an exterior stator cylinder 524 having a rotor end wall 526 and an exit end wall 528. An internal stator cylinder 530 substantially co-axial with the exterior stator cylinder 524 is connected to the exit end wall 528. A wiring area 532 is defined between the exterior stator cylinder 524 and the internal stator cylinder 530. A stator and fiber optic rotary joint area 534 is defined within the internal stator cylinder 530.

The illustrated rotor 114 includes an exterior cylindrical portion 536 extending from the rotor end wall 526 of the stator 106 and an interior portion 538 located within the stator and fiber optic rotary joint area 534 of the stator 106. The exterior cylindrical portion 536 defines a tubular housing 540 having an entrance end 535 opposite the stator 106. The fiber optic cable 500 enters the entrance end 535 of the exterior cylindrical portion 536 of the rotor 114 through a center portion thereof. It is contemplated that the fiber optic cable 500 outside of the rotor 114 can have a connector 542 (e.g., a SC, LC, FC, ST, SMA or pigtail type connector) for connecting the fiber optic cable 500 passing through the infinite rotation fiber optic and slip ring joint 14 to the fiber optic cable 500 of the first section 46, the second section 52, the third section 170 or the fourth section 350 of the cabling system 22. It is also contemplated that the fiber optic cable 500 can run uninterrupted up to and between the infinite rotation fiber optic and slip ring joints 14. The ground wires 502, the AC power wires 504, the low voltage wires 506, the twisted pairs of serial data wires 508 and the coaxial cables 510 enter the entrance end 535 of the exterior cylindrical portion 536 of the rotor 114 adjacent a peripheral edge 544 of the entrance end 535.

Figure 11:
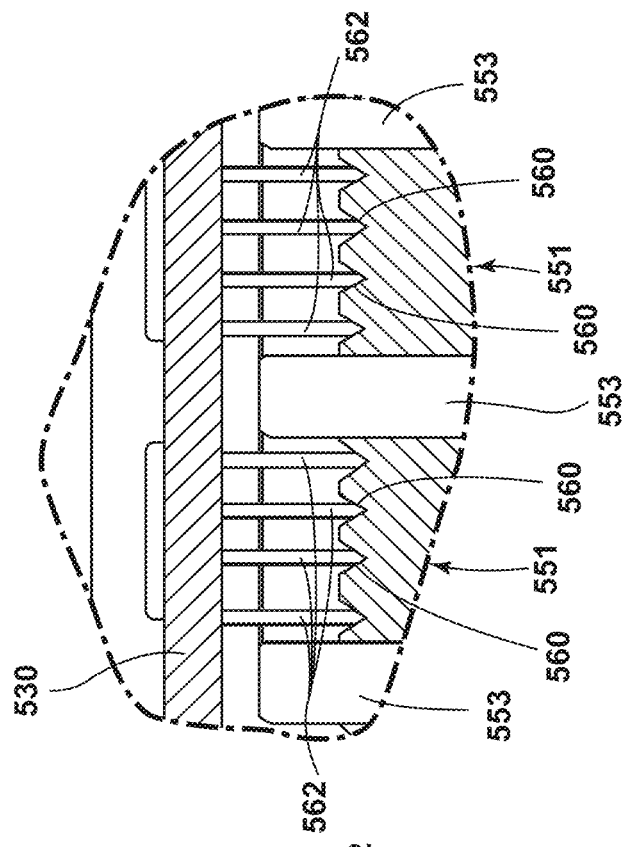
FIG. 11 is an enlarged cross-sectional view of a second area of the infinite rotation fiber optic and slip ring rotary joint according to the present invention taken from the circle XI of FIG. 9A.
Figure 10:
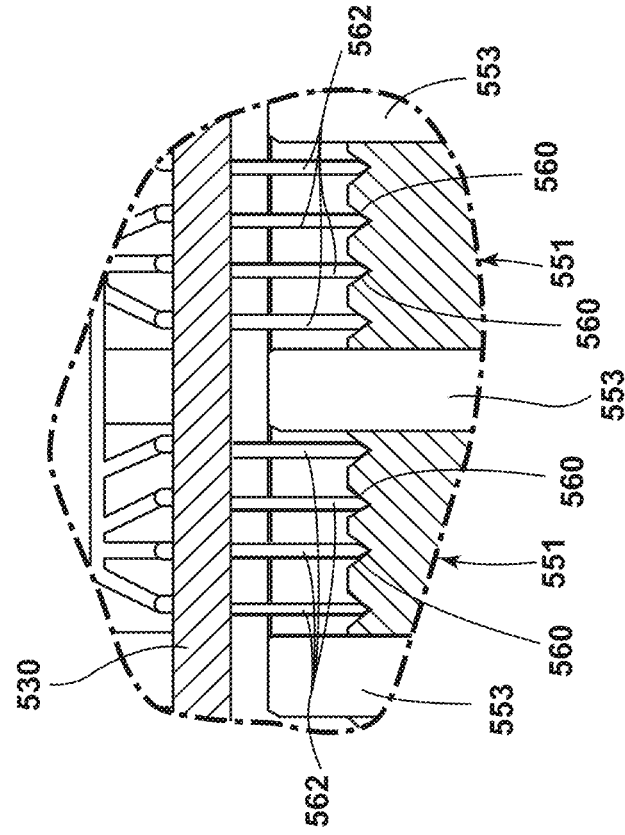
FIG. 10 is an enlarged cross-sectional view of a first area of the infinite rotation fiber optic and slip ring rotary joint according to the present invention taken from the circle X of FIG. 9A.

The illustrated ground wires 502, the AC power wires 504, the low voltage wires 506, the twisted pairs of serial data wires 508 and the coaxial cables 510 entering the exterior cylindrical portion 536 of the rotor 114 are connected to a center rotating shaft 546 made up of a plurality of individual contact rings 551 and forming the interior portion 538 of the rotor 114. Each of the ground wires 502, the AC power wires 504, the low voltage wires 506, the serial data wires 508 and the coaxial cables 510 are connected to one of the individual contact rings 551 of the center rotating shaft 546. As illustrated in FIGS. 10 and 11, each of the individual contact rings 551 are separate by an insulation ring 553 to prevent power or data from crossing over to adjacent individual contact rings 551. Each of the individual contact rings 551 include a plurality of circumferential grooves 560 for receiving contact members 562 of the stator 106 as discussed in more detail below. It is contemplated that the individual contact rings 551 transferring power can be located closer to the exterior cylindrical portion 536 of the rotor 114, can have larger diameters and can have adjacent insulation rings 553 with a greater thickness (see FIG. 10) than the individual contact rings 551 transferring data (see FIG. 11). The center rotating shaft 546 includes a plurality of terminal end openings 564 for accepting fasteners 566 therein to connect a rotor portion 568 of the fiber optic rotary joint 522 to the center rotating shaft 546. The center rotating shaft 546 also includes a circumferential groove 548 at an end thereof opposite the exterior cylindrical portion 536 of the rotor 114. A bearing ring 550 is located within the circumferential groove 548 to support the center rotating shaft 546 and to allow the center rotating shaft 546 to rotate within the stator 106.

Figure 9A:
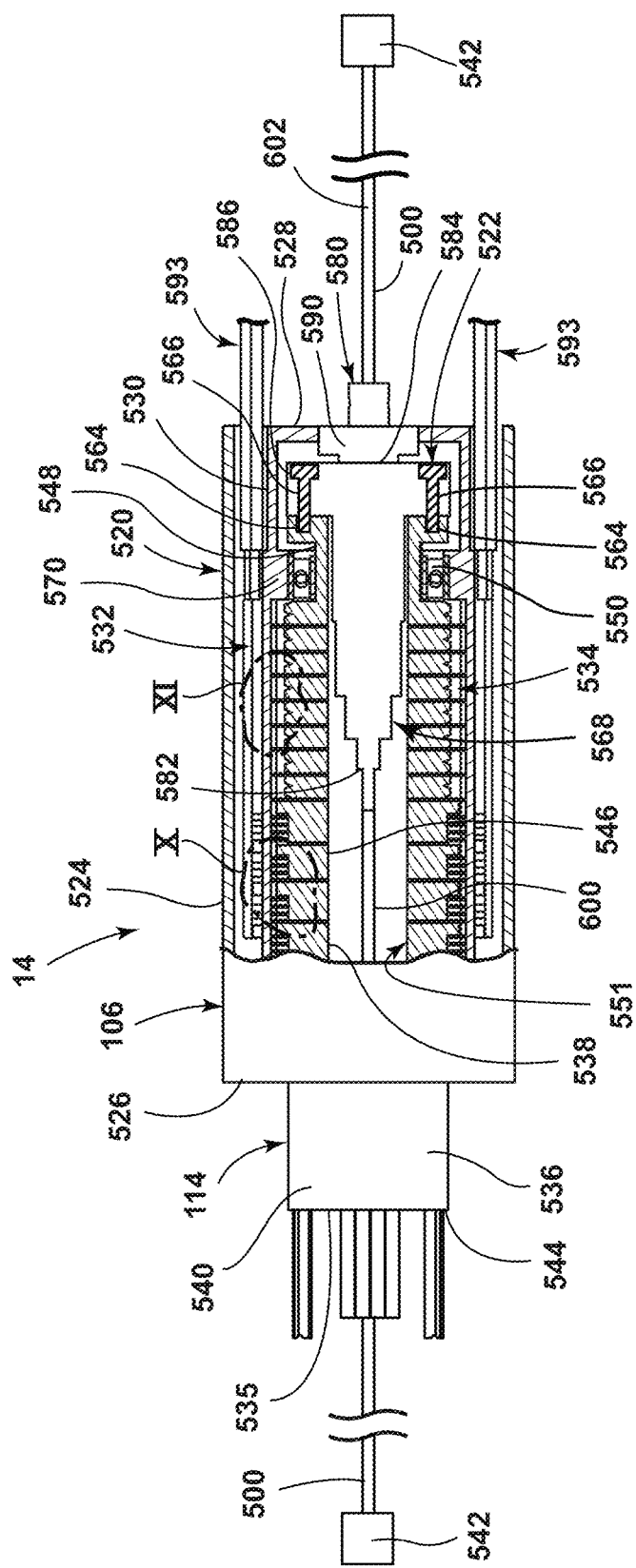
FIG. 9A is a partial cross-sectional side view of a infinite rotation fiber optic and slip ring rotary joint according to the present invention.
Figure 9C:
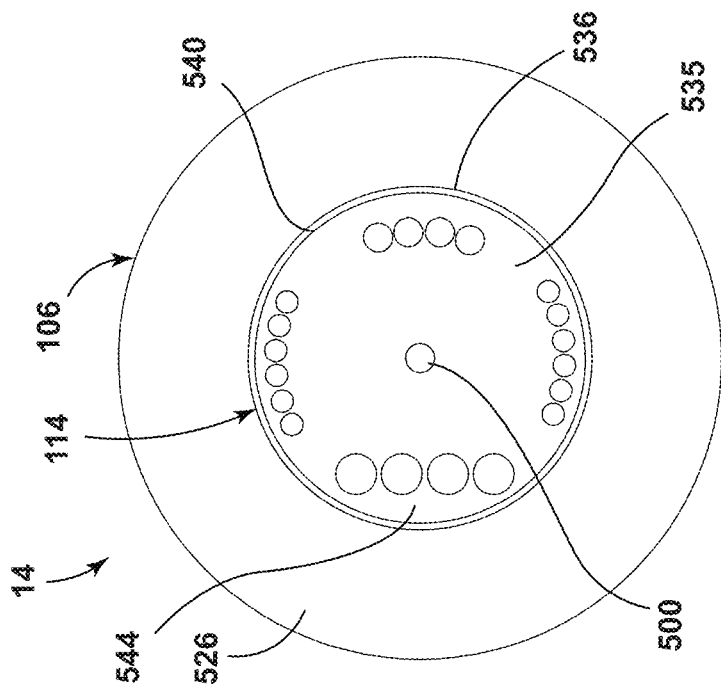
FIG. 9C is a second end view of the infinite rotation fiber optic and slip ring rotary joint according to the present invention.
Figure 9B:
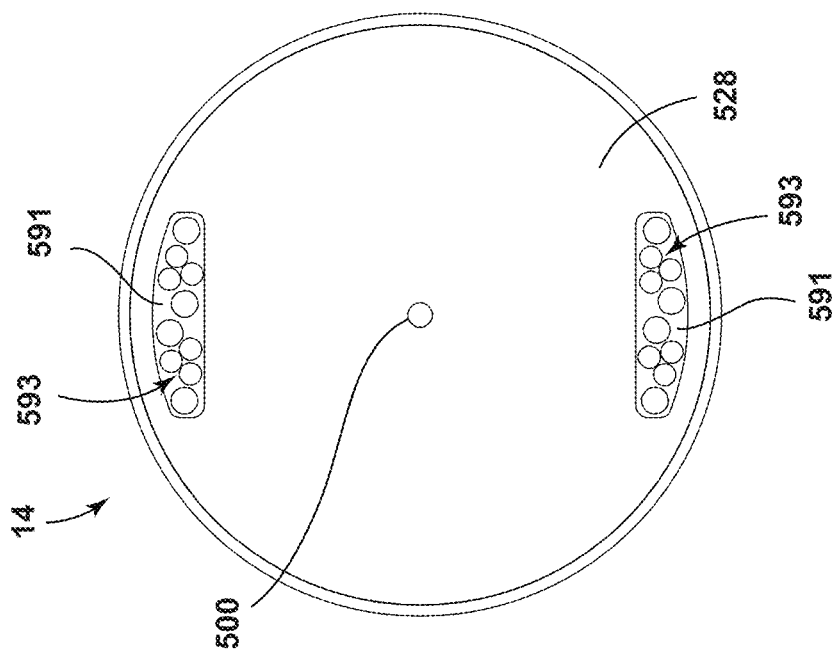
FIG. 9B is a first end view of the infinite rotation fiber optic and slip ring rotary joint according to the present invention.

The illustrated stator 106 includes a portion of the rotor 114 therein to receive data and power from the rotor 114. The stator 106 includes the exterior stator cylinder 524 having the rotor end wall 526 and the exit end wall 528, with the internal stator cylinder 530 extending substantially co-axial with the exterior stator cylinder 524 from the exit end wall 528. The internal stator cylinder 530 includes an enlarged abutment area 570 abutting the bearing ring 550 located within the circumferential groove 548 of the center rotating shaft 546 of the rotor 114 to allow the center rotating shaft 546 and the rotor 114 to rotate relative to the stator 106. The contact members 562 extend through the internal stator cylinder 530 (see FIGS. 10 and 11) and make contact with the plurality of circumferential grooves 560 in the individual contact rings 551 of the internal stator cylinder 530. The contact members 562 on the outside surface of the internal stator cylinder 530 are engaged with the ground wires 502, the AC power wires 504, the low voltage wires 506, the twisted pairs of serial data wires 508 and the coaxial cables 510 exiting the stator 106. As illustrated in FIGS. 9A and 9B, the ground wires 502, the AC power wires 504, the low voltage wires 506, the twisted pairs of serial data wires 508 and the coaxial cables 510 exit the exit end wall 528 through openings 591 located adjacent the periphery of the exit end wall 528 in wiring groups 593.

The power and data is transferred from the ground wires 502, the AC power wires 504, the low voltage wires 506, the twisted pairs of serial data wires 508 and the coaxial cables 510 entering the infinite rotation fiber optic and slip ring joint 14 to the ground wires 502, the AC power wires 504, the low voltage wires 506, the twisted pairs of serial data wires 508 and the coaxial cables 510 exiting the infinite rotation fiber optic and slip ring joint 14. As discussed above, the power and data is first transferred from the ground wires 502, the AC power wires 504, the low voltage wires 506, the twisted pairs of serial data wires 508 and the coaxial cables 510 entering the infinite rotation fiber optic and slip ring joints 14 to the individual contact rings 551 of the center rotating shaft 546. The contact members 562 extending through the internal stator cylinder 530 of the stator 106 make contact with the plurality of circumferential grooves 560 in the individual contact rings 551 of the internal stator cylinder 530 to transfer the power and data. It is contemplated that the contact members 562 can be brushes (e.g., graphite particles dispersed in a matrix of silver with the individual contact rings 551 also being made of silver, gold alloys forming a mono or multi-filament brush with the individual contact rings 551 also be made of a gold based alloy, etc.), a flexure ring that bridges the outer ring and the inner ring and that moves like balls in a ball bearing, or liquid mercury. The power and data is thereafter transferred through the contacts to the ground wires 502, the AC power wires 504, the low voltage wires 506, the twisted pairs of serial data wires 508 and the coaxial cables 510 entering the infinite rotation fiber optic and slip ring joint 14 to the ground wires 502, the AC power wires 504, the low voltage wires 506, the twisted pairs of serial data wires 508 and the coaxial cables 510 exiting the infinite rotation fiber optic and slip ring joint 14. While power and data is discussed above and travelling only in one direction from the rotor 114 to the stator 106, the power and data can travel in both directions through the infinite rotation fiber optic and slip ring joint 14. Moreover, the infinite rotation fiber optic and slip ring joint 14 is capable of being orientated in any direction (e.g., either the stator 106 or the rotor 114 being located first in the direction of data and power in the cabling system 22 to the wired medical unit 16). The fiber optic cable 500 exits the exit end wall 528 of the stator 106 through a center portion thereof. It is contemplated that the fiber optic cable 500 outside of the stator 106 can have the connector 542 (e.g., a SC, LC, FC, ST, SMA or pigtail type connector) for connecting the fiber optic cable 500 passing through the infinite rotation fiber optic and slip ring joint 14 to the fiber optic cable 500 of the first section 46, the second section 52, the third section 170 or the fourth section 350 of the cabling system 22. It is also contemplated that the fiber optic cable 500 can run uninterrupted up to and between the infinite rotation fiber optic and slip ring joints 14.

In the illustrated example, data also passes through the infinite rotation fiber optic and slip ring joint 14 through the fiber optic rotary joint 522 within the slip ring housing 520. The fiber optic rotary joint 522 includes the rotor portion 568 and a stator portion 580. The rotor portion 568 includes increasing larger diameter areas having an entrance end 582 and a stator connection end 584. A largest diameter area 586 of the rotor portion 568 includes the fasteners 566 extending therethrough and into the terminal end openings 564 of the center rotating shaft 546 of the rotor 114 to force the rotor portion 568 of the fiber optic rotary joint 522 to rotate with the remainder of the rotor 114. The stator portion 580 of the fiber optic rotary joint 522 is rotatably connected to the rotor portion 568. The stator portion 580 of the fiber optic rotary joint 522 includes a head 590 connected to the exit end wall 528 of the exterior stator cylinder 524 of the stator 106 such that the stator portion 580 of the fiber optic rotary joint 522 remains stationary with the remainder of the stator 106.

The illustrated fiber optic cable 500 enters the rotor 114 through the entrance end 535 of the tubular housing 540 of the exterior cylindrical portion 536 of the rotor 114 and exits the stator 106 through the head 590 of the stator portion 580 of the fiber optic rotary joint 522. The fiber optic cable 500 is split within the fiber optic rotary joint 522 such that a first portion 600 of the fiber optic cable 500 within the fiber optic rotary joint 522 rotates with the rotor portion 568 of the fiber optic rotary joint 522 and a second portion 602 of the fiber optic cable 500 within the fiber optic rotary joint 522 remains stationary with the stator portion 580 of the fiber optic rotary joint 522. The data is transferred from the first portion 600 of the fiber optic cable 500 to the second portion 602 of the fiber optic cable 500 in a manner well known to those skilled in the art. The fiber optic rotary joint 522 can be the fiber optic rotary joint disclosed in U.S. Patent Application Publication No. 2009/0226131 entitled "FIBER OPTIC ROTARY COUPLER," the entire contents of which are hereby incorporated herein by reference. The fiber optic rotary joint 522 can also be a fiber rotary joint sold as part number MJXX-131-50T-STD or MJXX-131-50T-STP by Princetel, Inc. of Hamilton, N.J. The fiber optic rotary joint 522 can be made of any suitable material (e.g., stainless steel).

Figure 12:
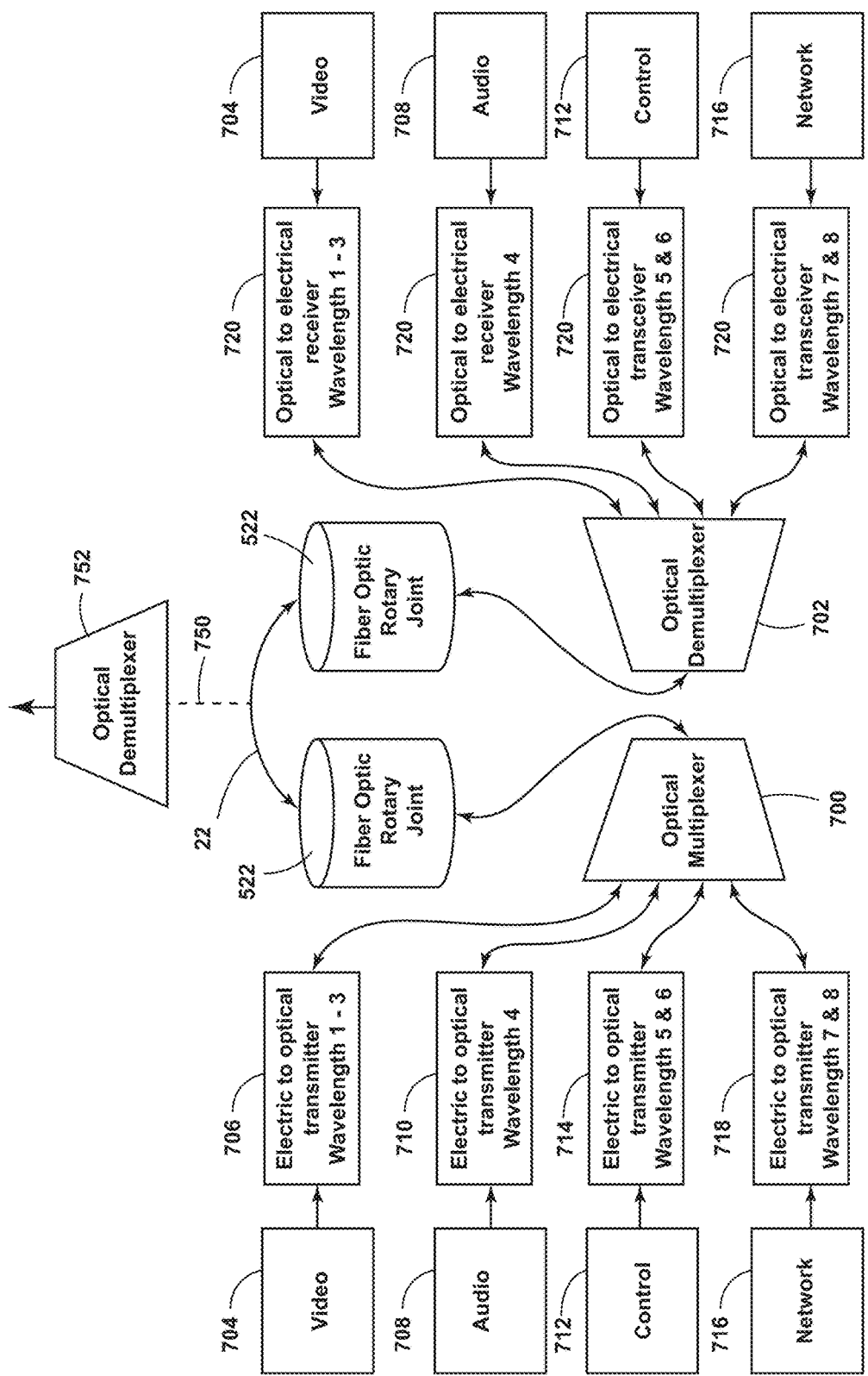
FIG. 12 a schematic view of the data communications across a fiber optic rotary joint using a multiplexer according to the present invention.

In the illustrated embodiment, the data passing through the fiber optic cable 500 can be subjected to an optical multiplexer 700 before the data passes through the fiber optic rotary joint 522 and then passed through an optical demultiplexer 702 before passing the data to the wired medical unit 16. For example, as illustrated in FIG. 12, a plurality of video signals 704 can be passed through an electric to optical transceiver 706, with each of the video signals 704 having different wavelengths, before the video signals 704 are passed to the optical multiplexer 700. Furthermore, an audio signal 708 can be passed through an electric to optical transceiver 710 before the audio signal 708 is passed to the optical multiplexer 700. Moreover, a plurality of control signals 712 can be passed through an electric to optical transceiver 714, with each of the control signals 712 having different wavelengths, before the control signals 712 are passed to the optical multiplexer 700. Likewise, a plurality of network signals 716 can be passed through an electric to optical transceiver 718, with each of the network signals 716 having different wavelengths, before the network signals are passed to the optical multiplexer 700. Each of the video signals 704, the audio signal 708, the control signals 712 and the network signals 716 are at different wavelengths before the signals are passed to the optical multiplexer 700, where the signals are combined. The optical demultiplexer 702 separates the signals and optical to electrical transceivers 720 will transform the video signals 704, the audio signal 708, the control signals 712 and the network signals 716 from optical signals to electrical signals. The optical multiplexer 700 and the optical demultiplexer 702 allow for multiple signals to be passed through the fiber optic cable 500 and the fiber optic rotary joints 522. Use of the optical multiplexer 700 and the optical demultiplexer 702 for passing multiple signals through cables is well known to those skilled in the art. Using the optical multiplexer 700 and the optical demultiplexer 702, multiple data can be sent through a single wire. For example, an HDMI signal with 4k resolution along with a bidirectional Ethernet signal through the fiber optic cable 500. Although the optical multiplexer 700 is referred to as a multiplexer and the optical demultiplexer 702 is referred to as a demultiplexer, both the optical multiplexer 700 and the optical demultiplexer 702 are both multiplexers and demultiplexers because the data flows in both directions (i.e., is bidirectional). It is contemplated that circulators could be used in concert with the optical multiplexer 700 and the optical demultiplexer 702 to double the capacity of the fiber optic cable 500.

The suspension arm assembly 10 of the present invention is illustrated as having the arms 12 in a single line having a single end point such that only two arms 12 meet at the infinite rotation joints. However, it is contemplated that three or more arms 12 could meet at a single joint. In such an arrangement, at least one of the ground wires 502, the AC power wires 504, the low voltage wires 506, the twisted pairs of serial data wires 508, the coaxial cables 510 and the fiber optic cable 500 could continue along each branch of the arms 12 at the infinite rotation joints. Furthermore, it is contemplated that the wires and/or cables could be split at the infinite rotation joints such that the power and data is sent along each branch of arms 12 to the wire medical units 16 at the end of each branch. FIG. 12 illustrates a situation wherein the data from the optical multiplexer 700 is split off into a branch line 750 at an infinite rotation joint and sent to a second optical demultiplexer 752 before being sent to an optical to electrical transceivers 720 and ultimately to a second wired medical unit 16.

In an aspect of the present invention, multiple data and power signals can be sent along the arms 12 of the suspension arm assembly 10 having multiple infinite rotation joints with unlimited range (i.e., unlimited range of rotation and number of rotations). Therefore, the suspension arm assembly 10 allows for a large data transfer rate while simultaneously allowing the suspension arm assembly 10 to be fully and easily adjustable to any desired location. The arms 12 can be made of any material (e.g., plastic and/or metal) and can be sealed to prevent contamination from entering the suspension arm assembly 10, Furthermore, the arms 12 can have any cross-sectional shape (e.g., square, circular and/or rectangular). Moreover, it is contemplated that the suspension arm assembly 10 could include mechanisms to hold the arms 12 in a particular rotated position (e.g., springs, balls, wedges, toggles, etc.). Additionally, it is contemplated that the cabling 22 could have one or a plurality of connectors (e.g., a SC, LC, FC, ST, SMA or pigtail type connector) within each arm for connecting a first part of the cabling in an arm to a second part of the cabling in an arm (e.g., to assist in routing the cabling 22 through each arm). Furthermore, it is contemplated that the cabling 22 only need to extend to an end item requiring the high definition data (which includes ultrahigh definition data and data that results in resolution above standard definition resolution) to be sent thereto (e.g., if a monitor is directly connected to the extension arm 26, the fiber optic cable could only travel through the first infinite rotation joint 28 to the monitor, with other cabling traveling through the arms 12 to another area of the arms). If the cabling 22 does not travel to the end of the arms 12, it is contemplated that the arms after the end of the cabling do not need to have any further infinite rotation joints. Furthermore, it is contemplated that less than all of the joints of the suspension arm assembly 10 could have infinite rotation. For example, it is contemplated that the first joint 28 or both the first joint 28 and the second joint 30 could include stops preventing unlimited rotation at these joints. In such a situation, it is contemplated that the infinite rotation fiber optic and slip ring joint 14 could still be used at these joints to transmit power and data, only with stops limiting rotation, or that these joints could have other configurations for transmitting power and data with mechanical stops limiting rotation (with, for example, all of the wiring passing directly through these joints).

The reference numeral 10*a* (FIG. 13) generally designates another embodiment of the present invention, having a second embodiment for the suspension arm assembly. Since suspension arm assembly 10*a* is similar to the previously described suspension arm assembly 10, similar parts appearing in FIGS. 1-12 and FIG. 13, respectively, are represented by the same, corresponding reference number, except for the suffix "a" in the numerals of the latter. The second embodiment of the suspension arm assembly 10*a* is substantially similar to the first embodiment of the suspension arm assembly 10, except that the second embodiment of the suspension arm assembly 10*a* includes a separable infinite rotation fiber optic and slip ring joint 800 in place of the infinite rotation fiber optic and slip ring joint 14. The separable infinite rotation fiber optic and slip ring joint 800 is located at any or all of the first infinite rotation joint 28*a* between the ceiling attachment member 24*a* and the extension arm 26*a*, the second infinite rotation joint 32*a* between the extension arm 26*a* and the load counterbalancing spring arm 30*a*, and the third infinite rotation joint 34*a* between the display support assembly 18*a* and the load counterbalancing spring arm 30*a*. The separable infinite rotation fiber optic and slip ring joint 800 allows for automatic connection of the fiber optic cable and the remaining wires of the cabling system on both sides of the joints 28*a*, 30*a*, 32*a* when the elements on both sides of the joints 28*a*, 30*a*, 32*a* are connected (e.g., when the extension arm 26*a* is connected to the ceiling attachment member 24*a*). The separable infinite rotation fiber optic and slip ring joint 800 allows for easier assembly of the suspension arm assembly 10*a*. It is contemplated that the separable infinite rotation fiber optic and slip ring joint 800 could be used at any intersection or joint for allowing for unlimited rotation of the joint along with passing information through the joint via a fiber optic cable and other wiring.

In the illustrated example, the separable infinite rotation fiber optic and slip ring joint 800 is configured to be separated to allow for easy assembly and disassembly. It is contemplated that the separable infinite rotation fiber optic and slip ring joint 800 could be separable by having the rotor 114*a* being separable from the stator 106*a*, by having a two-part separable rotor 114*a* and/or by having a two-part separable stator 106*a*. In the illustrated embodiment, the separate parts of the separable infinite rotation fiber optic and slip ring joint 800 automatically engage when the elements on both sides of the joints 28*a*, 30*a*, 32*a* are connected. Therefore, the separable elements of the separable infinite rotation fiber optic and slip ring joint 800 can be connected without using any tools directly thereon to be able to pass signals over the fiber optic cable and the wires of the separable infinite rotation fiber optic and slip ring joint 800.

Figure 13:
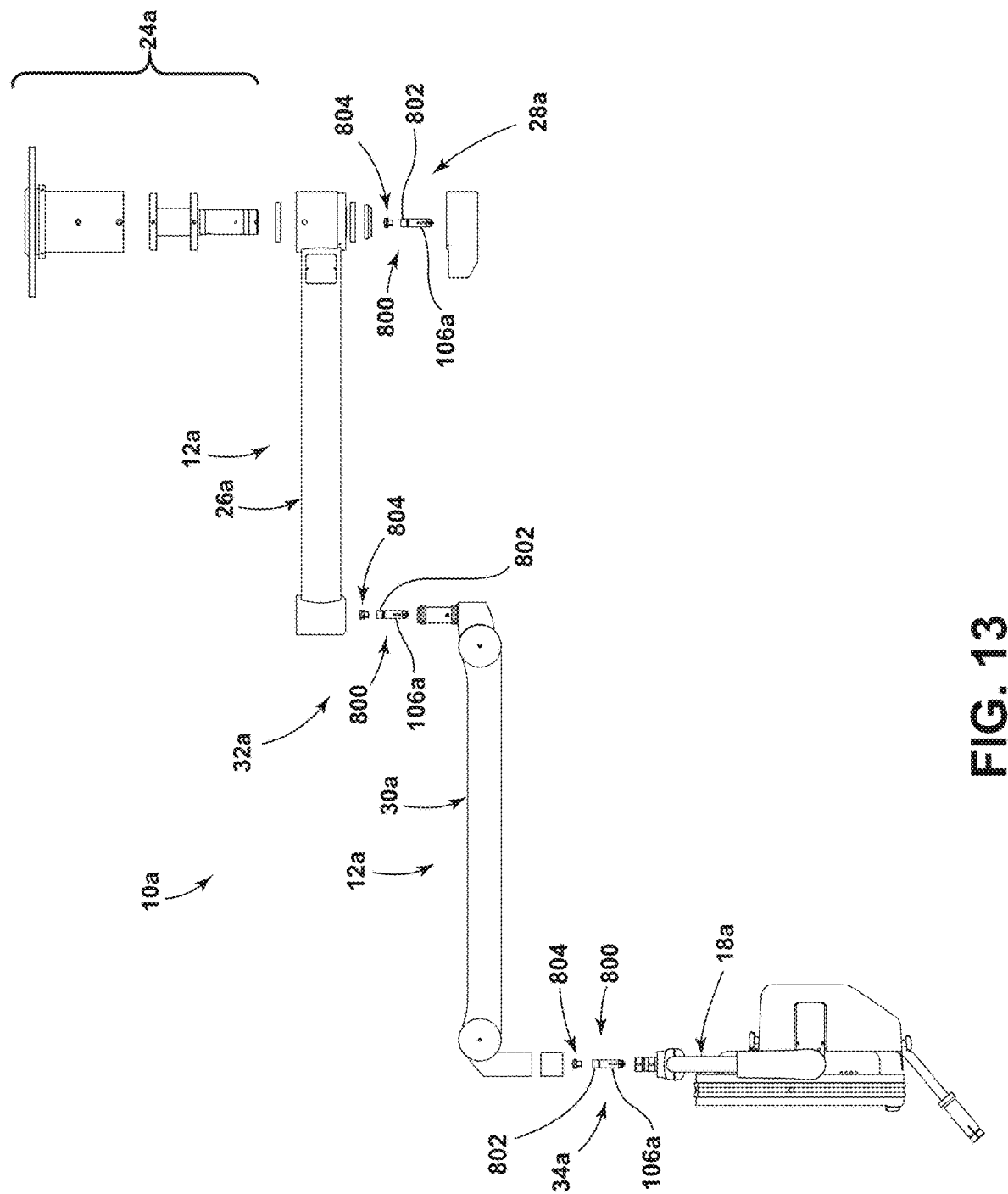
FIG. 13 is an exploded side view of the suspension arm assembly having separable infinite rotation fiber optic and slip ring joints according to the present invention.

FIGS. 13-33 illustrate an embodiment of the separable infinite rotation fiber optic and slip ring joint 800 wherein the separable infinite rotation fiber optic and slip ring joint 800 is separable by having a two-part separable rotor 114*a*. The two-part separable rotor 114*a* includes a main rotor 802 and a rotor connector 804 that is removably connected to the main rotor 802. The main rotor 802 in the illustrated embodiment is fixed to the stator 106*a*. In the present example, when any of the arms 12*a* are connected together, the main rotor 802 and the stator 106*a* will be fixed together in one arm 12*a* and the rotor connector 804 will be in the other arm 12*a*. While the rotor connector 804 in FIG. 13 is illustrated as not being connected to the adjacent element (e.g., the ceiling attachment member 24*a* or the extension arm 26*a* at the second infinite rotation joint 32*a*) the rotor connector 804 would be fixed to the adjacent element as the suspension arm assembly 10*a* is assembled. Likewise, the main rotor 802 and the stator 106*a* will also be fixed to the adjacent element (e.g., the extension arm 26*a* at the first infinite rotation joint 28*a*) as the suspension arm assembly 10*a* is assembled. Each of the separable parts of the separable infinite rotation fiber optic and slip ring joint 800 (whether the rotor and stator are separable or when the rotor or the stator are in two separate parts) will be fixed to the adjacent element as the suspension arm assembly 10*a* is assembled. Moreover, each of the separable parts of the separable infinite rotation fiber optic and slip ring joint 800 (whether the rotor and stator are separable or when the rotor or the stator are in two separate parts) would be attached to their respective arm components (e.g. spring arm, extension arm), and would remain attached to the arm components during disassembly (i.e., separation of the arm components).

The illustrated main rotor 802 (FIGS. 14-19) connects to the rotor connector 804 to form the separable infinite rotation fiber optic and slip ring joint 800. The main rotor 802 includes a stepped tube 806 having a small insertion tube section 808, a large outer tube section 810 and a stepped section 812 between the small insertion tube section 808 and the large outer tube section 810. The stepped tube 806 has an axial opening 814 therethrough for accommodating the fiber optic cable as discussed in more detail below. The small insertion tube section 808 has an insertion end 816 opposite the stepped section 812 configured to be inserted into the stator 106*a*. The stepped section 812 includes a first radial abutment face 826 at the small insertion tube section 808, a step surface 818 having a circumferential groove 820 therein and a second radial abutment face 828 at the large outer tube section 810. The circumferential groove 820 on the step surface 818 of the stepped section 812 is configured to receive a pair of locking members 822 to fix the main rotor 802 to the stator 106*a*. The large outer tube section 810 includes an axial counterbore 824 facing away from the stepped section 812 for receiving the rotor connector 804 therein.

Figure 16:
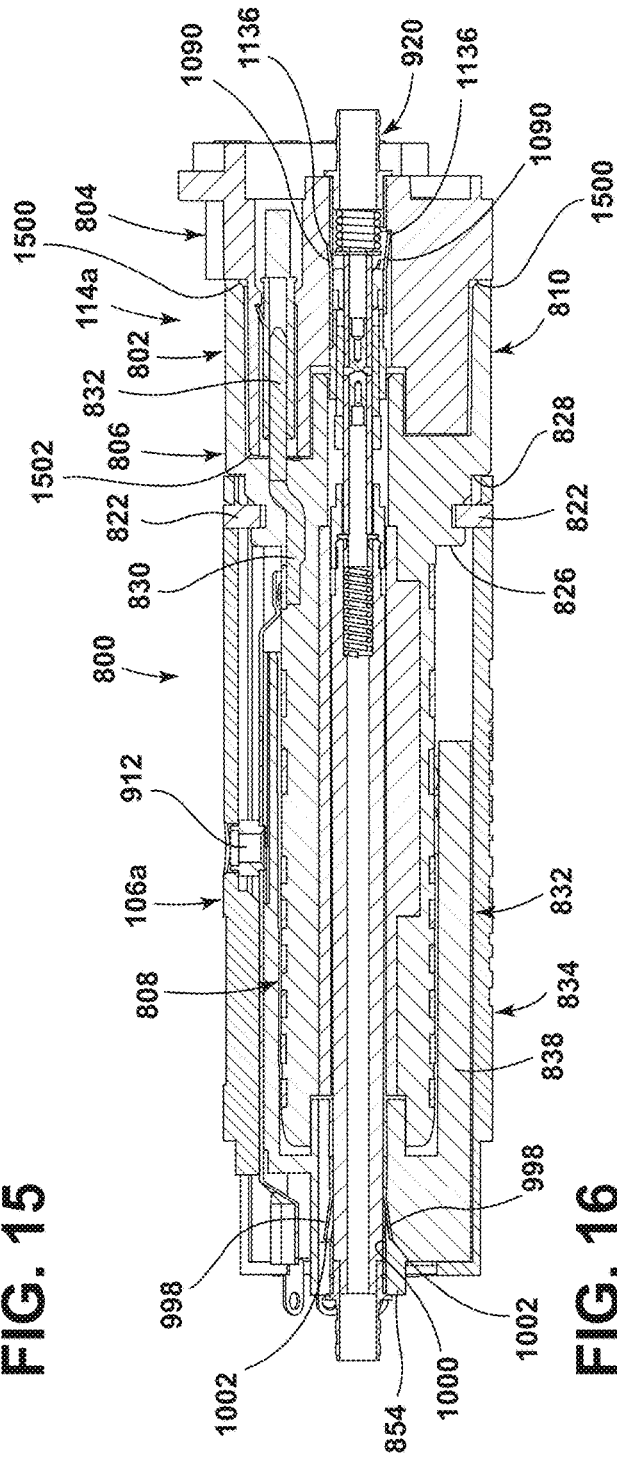
FIG. 16 is a cross-sectional view of the separable infinite rotation fiber optic and slip ring joint according to the present invention.
Figure 17:
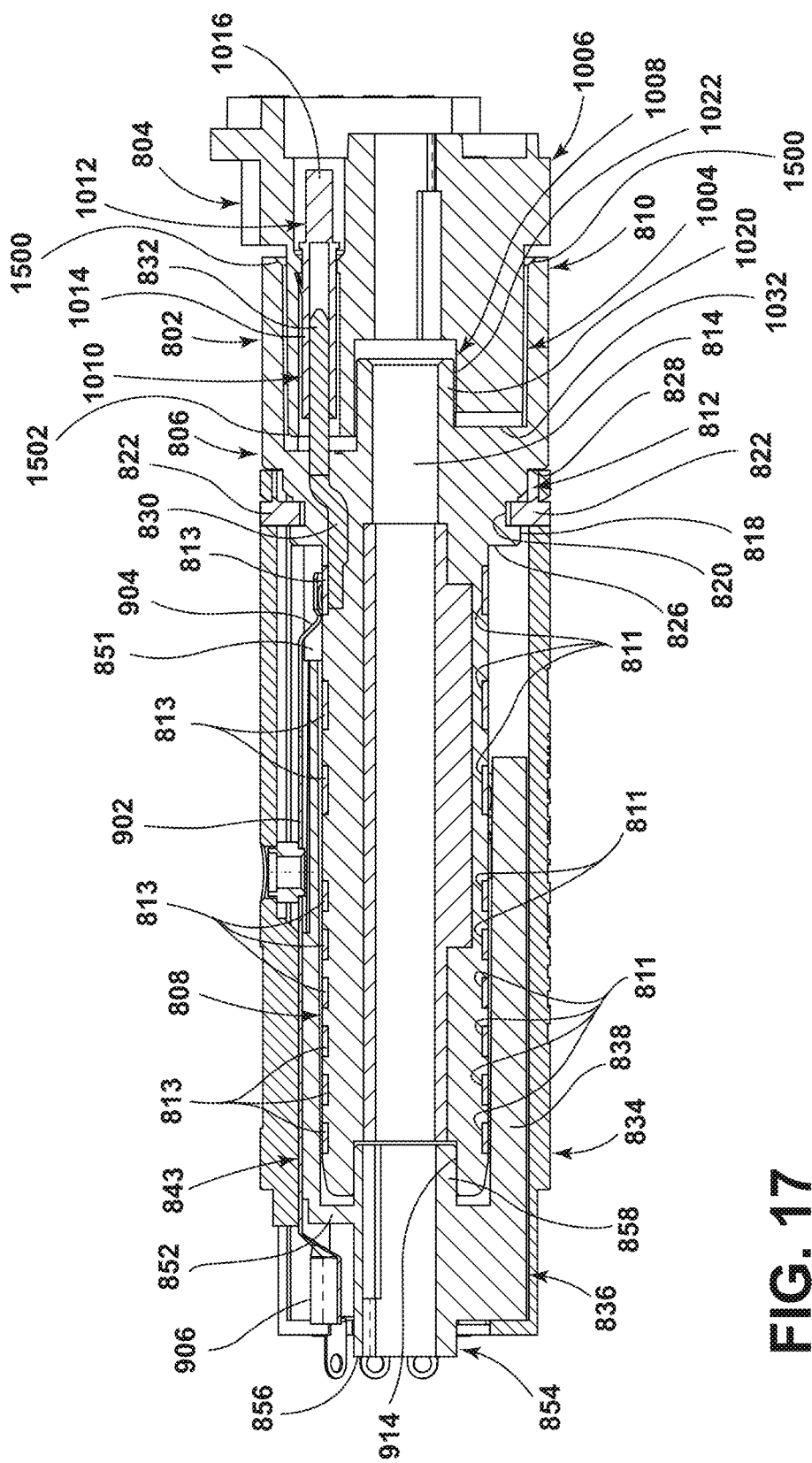
FIG. 17 is a cross-sectional view of the separable infinite rotation fiber optic and slip ring joint according to the present invention with a first optical connector and a second optical connector removed.
Figure 18:
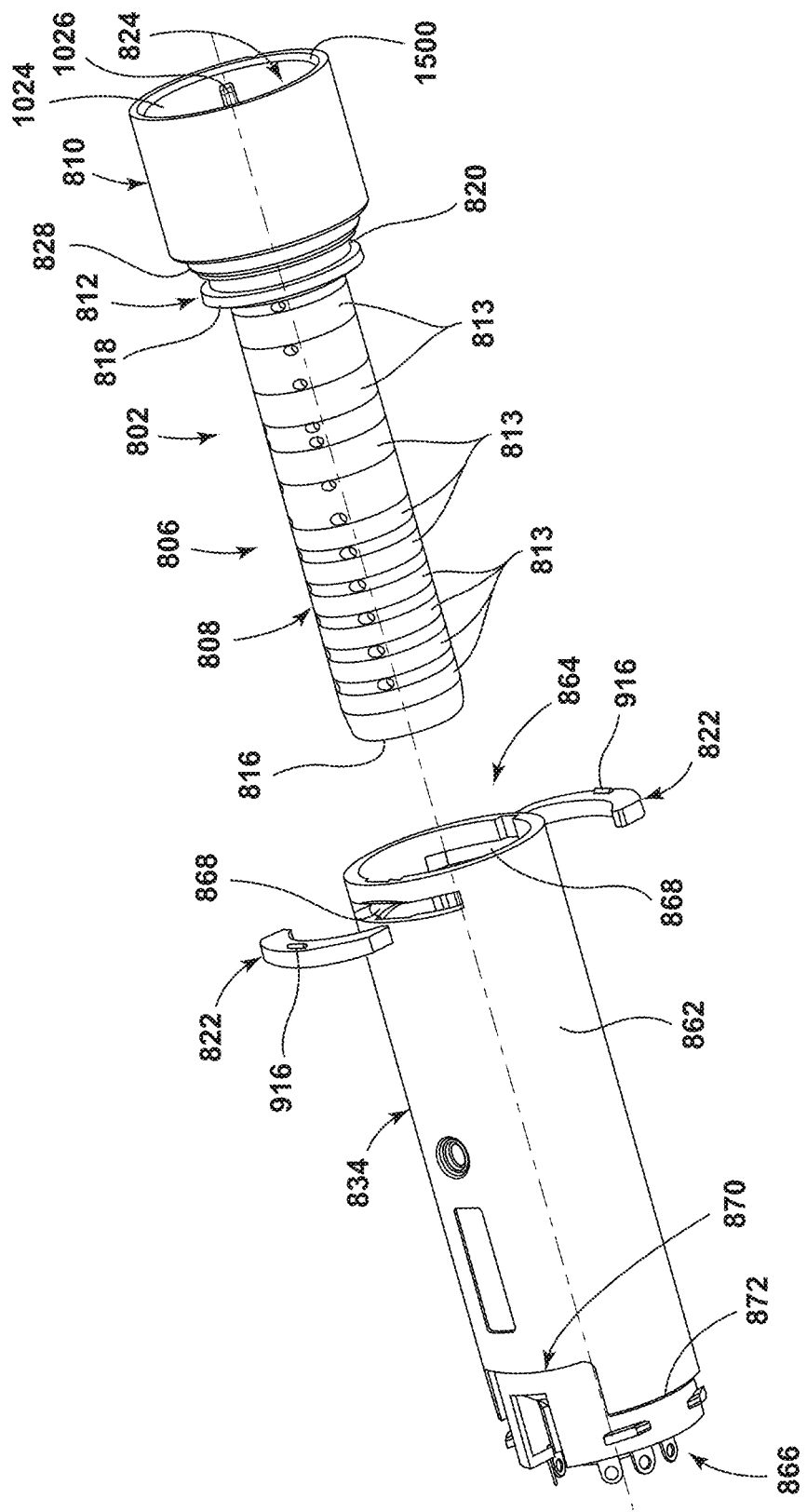
FIG. 18 is an exploded perspective view of a main rotor of a rotor and a stator of the separable infinite rotation fiber optic and slip ring joint according to the present invention and with the first optical connector and the second optical connector removed.
Figure 19:
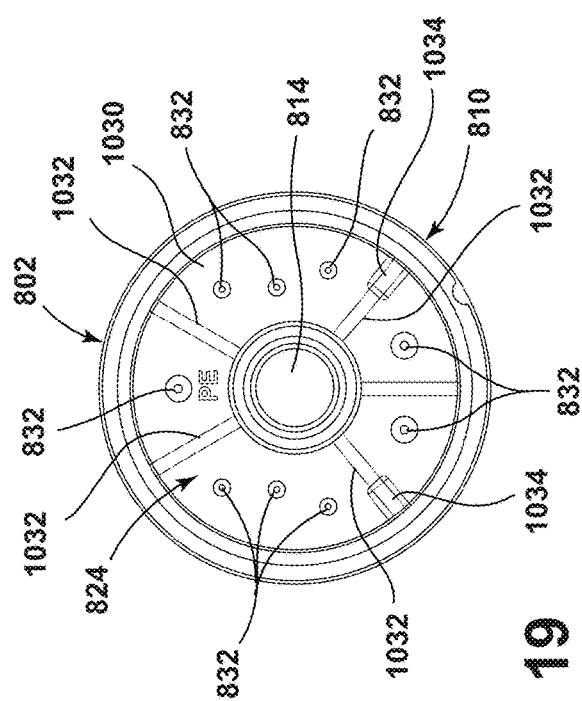
FIG. 19 is an end view of the main rotor of the rotor of the separable infinite rotation fiber optic and slip ring joint according to the present invention.

The illustrated main rotor 802 has a plurality of conduit paths therethrough. Each conduit path is formed by a contact ring 813, an interior conductive path 830 and an extension pin 832. As illustrated in FIGS. 16 and 18, the small insertion tube section 808 includes a plurality of circumferential orientated and axially spaced channels 811, with each channel 811 receiving one of the contact rings 813 therein. An interior surface of each of the contact rings 813 abuts one of the interior conductive paths 830, which pass through the stepped section 812 to engage the extension pin 832 that extends into the axial counterbore 824 in the large outer tube section 810 (see FIG. 19). The interior conductive paths 830 are each located at a different radial position within the stepped section 812 (with only one of the interior conductive paths 830 being illustrated in FIGS. 16 and 17). FIG. 19 illustrates an example of radial positions of the extension pins 832, with the conductive paths 830 substantially corresponding to the radial positions of the extension pins 832. While nine groups of contacts each comprising one of the contact rings 813, one of the conductive paths 830 and one of the extension pins 832 are shown, it is contemplated that any number of groups of contacts could be used. In the illustrated embodiment, the three contact rings 813 closest to the stepped section 812 conduct power (e.g., ground, AC power and low voltage) and the remaining contact rings 813 conduct data. Each of the extension pins 832 is received within a corresponding slot in the rotor connector 804 as discussed in more detail below.

In the illustrated example, the stator 106*a* fixedly receives the main rotor 802 therein. The stator 106*a* (FIGS. 14-18 and 20-24) includes an outer housing 834 and an inner housing 836 received within the outer housing 834. The inner housing 836 (FIGS. 16, 17, 20 and 21) includes an inner housing cylinder 838 having a main rotor receiving end 835 and a closed end 837. The inner housing cylinder 838 includes a plurality of axially extending data leaf spring contact channels 840 for accepting data leaf spring contacts 842 (FIG. 25) therein (see FIG. 20). Each of the data leaf spring contact channels 840 includes an axially open side 844 at the closed end 837 of the inner housing cylinder 838 and an inner stop wall 848 opposite the closed end 837. As illustrated in FIG. 21, the data leaf spring contact channels 840 include a radial opening 850 into an interior of the inner housing cylinder 838 adjacent the inner stop wall 848. Each of the radial openings 850 are at different axial positions to allow the data leaf spring contacts 842 within each data leaf spring contact channel 840 to contact a different one of the data contact rings 813 in the main rotor 802 of the rotor 114*a*. The illustrated example includes a pair of opposite sets of data leaf spring contact channels 840, with three data leaf spring contact channels 840 in each set. However, any number of data leaf spring contact channels 840 could be used.

Figure 20:
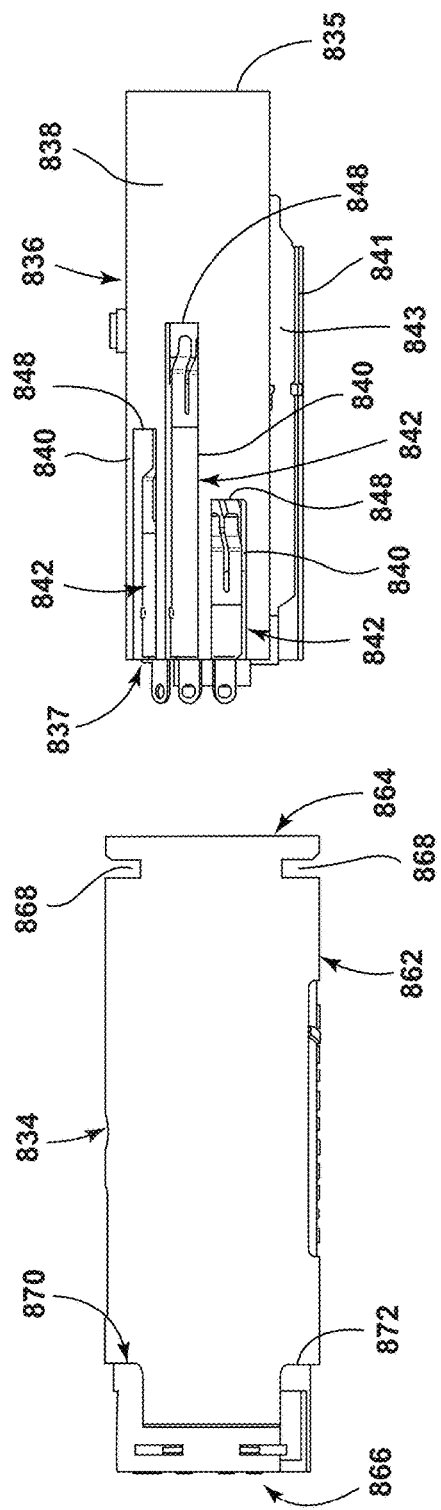
FIG. 20 is an exploded side view of the stator of the separable infinite rotation fiber optic and slip ring joint according to the present invention with the first optical connector removed.
Figure 21:
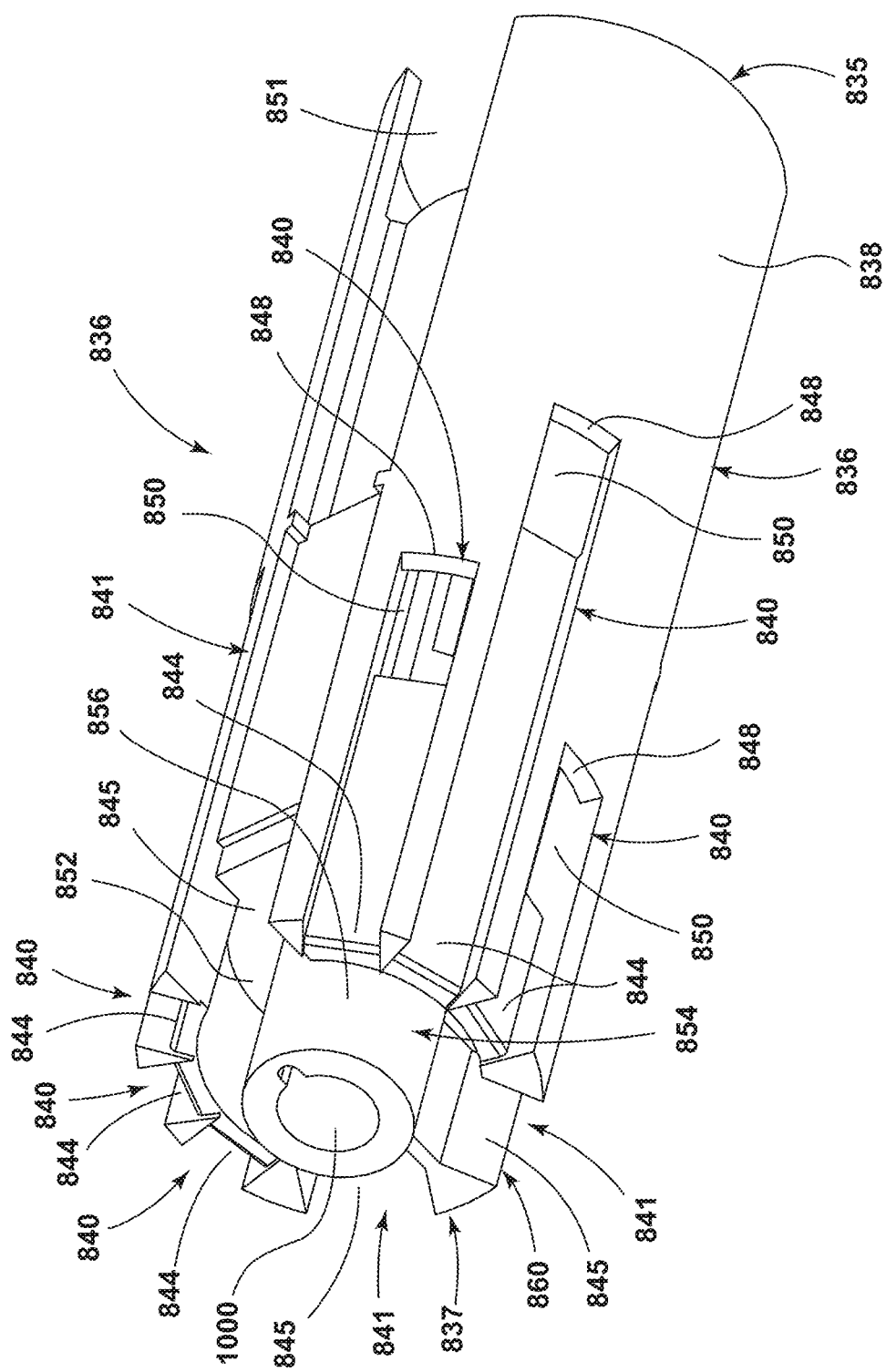
FIG. 21 is a perspective view of an inner housing of the stator of the separable infinite rotation fiber optic and slip ring joint according to the present invention.
Figure 22:
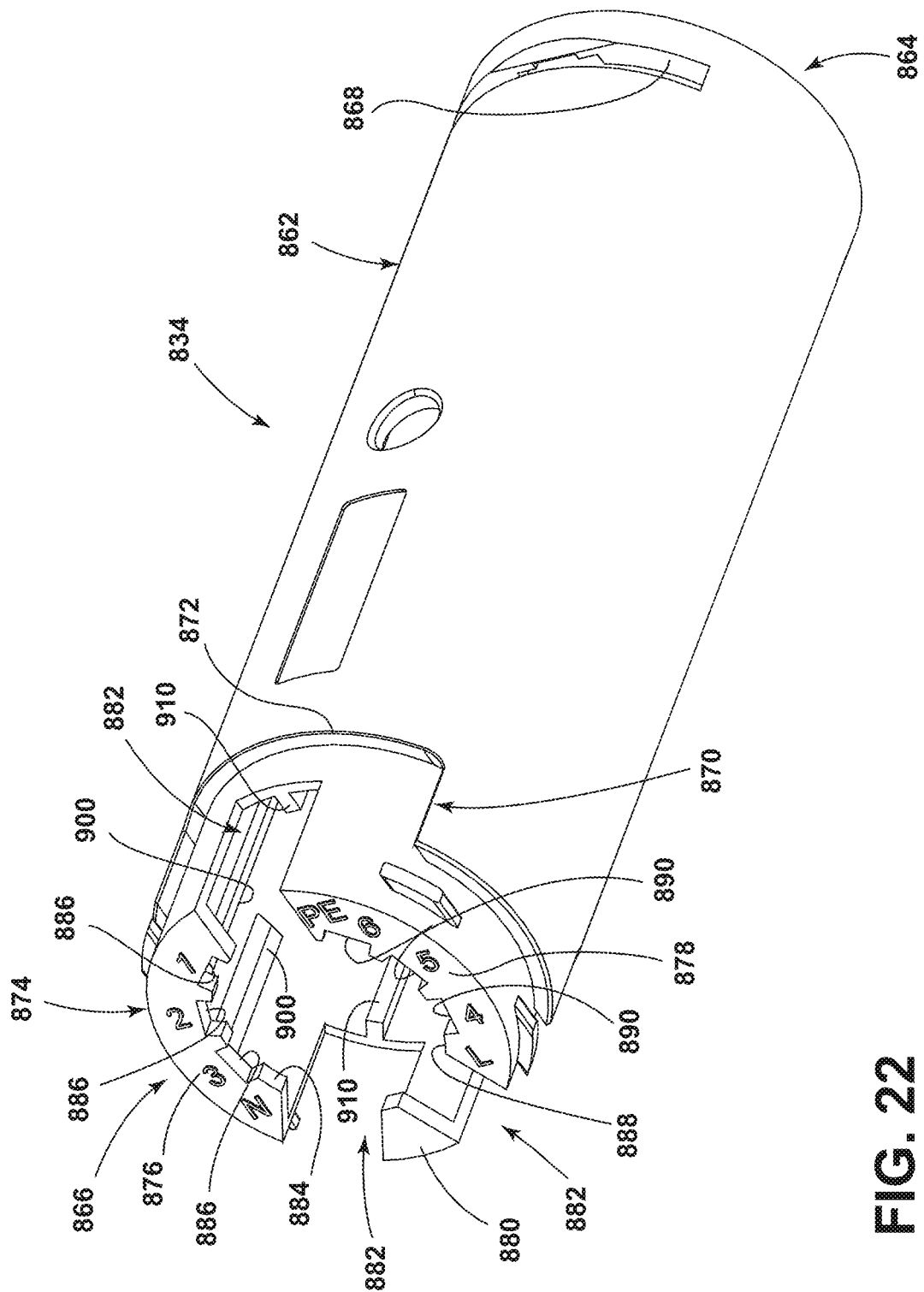
FIG. 22 is a perspective view of an outer housing of the stator of the separable infinite rotation fiber optic and slip ring joint according to the present invention.
Figure 25:
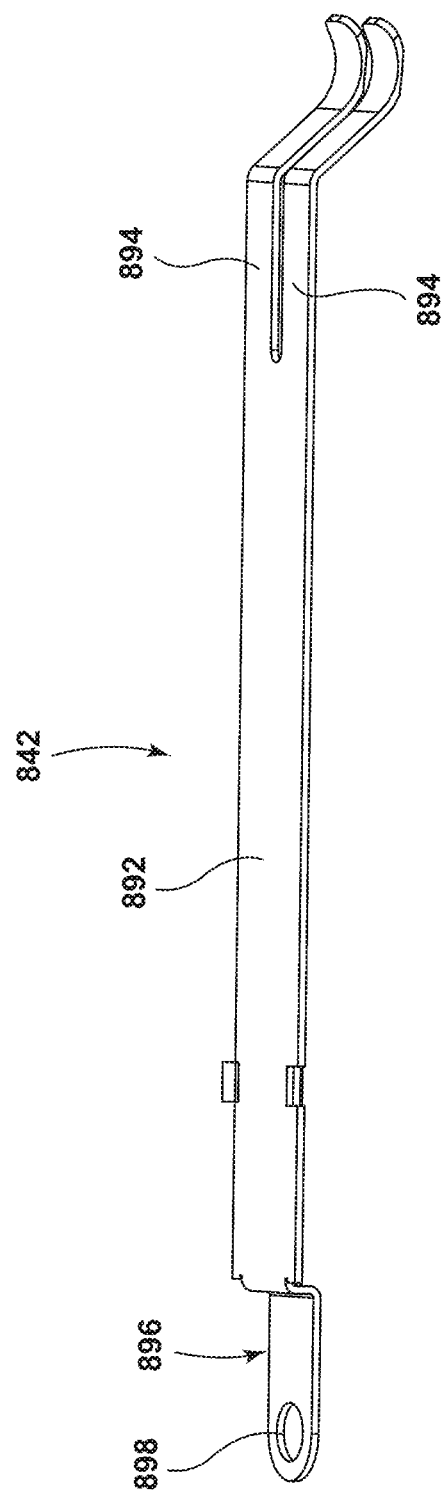
FIG. 25 is a side view of a data leaf spring contact of the separable infinite rotation fiber optic and slip ring joint according to the present invention.

The illustrated inner housing cylinder 838 also includes a plurality of axially extending power leaf spring contact channels 841 for accepting power leaf spring contacts 843 therein (see FIG. 20). Each of the power leaf spring contact channels 841 includes a radially and axially open side 845 at the closed end 837 of the inner housing cylinder 838. As illustrated in FIG. 21, the power leaf spring contact channels 841 include a radial opening 851 into an interior of the inner housing cylinder 838 at an end of the power leaf spring contact channels 841 opposite the closed end 837 of the inner housing cylinder 838. Each of the radial openings 851 are at different axial positions to allow the power leaf spring contacts 843 within each power leaf spring contact channel 841 to contact a different one of the power contact rings 813 in the main rotor 802 of the rotor 114*a*.

As illustrated in FIG. 21, the inner housing 836 includes a closed end wall 852 axially spaced from the closed end 837, with the closed end wall 852 being axially located such that the radially and axially open side 845 of the power leaf spring contact channels 841 are located between the closed end wall 852 and the closed end 837 of the inner housing 836. A central tube 854 extends through the closed end wall 852 from the closed end 837 and into an interior of the inner housing 836, wherein the central tube 854 includes an exterior section 856 and an interior alignment section 858. As illustrated in FIG. 21, a spanning member 860 extending radially from the exterior section 856 of the central tube 854 divides a pair of the power leaf spring contact channels 841.

In the illustrated example, the outer housing 834 of the stator 106*a* accepts the inner housing 836 of the stator 106*a* therein. The outer housing 834 includes an outer housing cylinder 862 having a receiving end 864 and a closed end 866. The outer housing cylinder 862 includes a pair of circumferential slots 868 adjacent the receiving end 864 for receiving the locking members 822 therein for locking the main rotor 802 to the stator 106*a* as discussed in more detail below. The outer housing cylinder 862 includes a recessed area 870 extending axially from the closed end 866 to a stepped bottom edge 872. The recessed area 870 defines a section of the outer housing cylinder 862 with a thickness smaller than the remaining portion of the outer housing cylinder 862. The closed end 866 of the outer housing cylinder 862 includes an interrupted end cap 874 including a first C-shaped portion 876, a second C-shaped portion 878 and a triangular portion 880. A plurality of axial openings 882 extend into the recessed area 870 between each of the first C-shaped portion 876, the second C-shaped portion 878 and the triangular portion 880. A radially inner edge 884 of the first C-shaped portion 876 includes a plurality of grooves 886 for receiving a portion of the data leaf spring contacts 842 therein and a radially inner edge 888 of the second C-shaped portion 878 includes a plurality of grooves 890 for receiving a portion of the data leaf spring contacts 842 therein.

The illustrated data leaf spring contacts 842 (FIG. 25) are configured to be located between the inner housing 836 and the outer housing 834 of the stator 106a. The data leaf spring contacts 842 each include a central flat portion 892, a pair of contact leaf springs 894 at a first edge of the central flat portion 892 and an L-shaped connecter 896 having a hole 898 at the second edge of the central flat portion 892. As illustrated in FIG. 20, the central flat portions 892 of the data leaf spring contacts 842 are received within the data leaf spring contact channels 840 of the inner housing cylinder 838. The pair of contact leaf springs 894 of the data leaf spring contacts 842 extend through the radial opening 850 to contact the contact rings 813 as illustrated in FIGS. 16 and 17. An interior surface of the outer housing cylinder 862 includes a plurality of axially extending projections 900 for holding the central flat portion 892 of the data leaf spring contacts 842 in place within the data leaf spring contact channels 840 when the inner housing 836 is inserted into the outer housing 834. The L-shaped connecter 896 of the data leaf spring contacts 842 abuts an inner edge of the grooves 886, 890 in the first C-shaped portion 876 and the second C-shaped portion 878 of the interrupted end cap 874 of the outer housing cylinder 862 of the stator 106a as illustrated in FIG. 24.

In the illustrated example, the power leaf spring contacts 843 (see FIGS. 17, 23 and 24) are configured to be located between the inner housing 836 and the outer housing 834 of the stator 106a. The power leaf spring contacts 843 each include a central flat portion 902, a pair of contact leaf springs 904 at a first edge of the central flat portion 902 and an U-shaped connecter 906 at the second edge of the central flat portion 902. As illustrated in FIG. 17, the central flat portions 902 of the power leaf spring contacts 843 are received within the power leaf spring contact channels 841 of the inner housing cylinder 838. The pair of contact leaf springs 904 of the power leaf spring contacts 843 extend through the radial opening 851 to contact the contact rings 813 as illustrated in FIGS. 16 and 17. An interior surface of the outer housing cylinder 862 includes a plurality of axially extending projections 910 (see FIG. 22) for holding the central flat portion 902 of the power leaf spring contacts 843 in place within the power leaf spring contact channels 841 when the inner housing 836 is inserted into the outer housing 834. The U-shaped connecter 906 of the power leaf spring contacts 843 is located in the radially and axially open side 845 of the power leaf spring contact channels 841 and the axial openings 882 of the outer housing cylinder 862.

The illustrated inner housing 836 of the stator 106a is fixed in position within the outer housing 834 of the stator 106a. As illustrated in FIGS. 16-18, the data leaf spring contacts 842 are positioned within the data leaf spring contact channels 840 of the inner housing cylinder 838 and the power leaf spring contacts 843 are positioned within the power leaf spring contact channels 841 of the inner housing cylinder 838. The inner housing 836 of the stator 106a is then inserted into the outer housing 834 of the stator 106a to form the stator 106a. The interrupted end cap 874 at the closed end 866 of the outer housing cylinder 862 helps to ensure that the inner housing 836 of the stator 106a is properly orientated in the outer housing 834. Furthermore, as illustrated in FIG. 17, a pin 912 can be inserted through the outer housing 834 and into the inner housing 836 (or into one of the channels 840, 841 (as shown)) to prevent relative rotation of the outer housing 834 and the inner housing 836. It is contemplated that the outer housing 834 and the inner housing 836 could be fixed in relative position in any manner.

In the illustrated example, the main rotor 802 of the rotor 114a is fixedly, but rotatably, connected to the stator 106a. The main rotor 802 is connected to the stator 106a by first inserting the small insertion tube 808 of the stepped tube 806 of the main rotor 802 into the inner housing 836 of the stator 106a. As illustrated in FIG. 17, the insertion end 816 of the small insertion tube section 810 has an internal annular shelf 914 surrounding the axial opening 814 in the main rotor 802. The internal section 858 of the central tube 854 of the inner housing cylinder 838 is inserted into the internal annular shelf 914 to locate the main rotor 802 in the stator 106a and is employed as a bearing during rotation of the main rotor 802 within the stator 106a. After the main rotor 802 is fully inserted into the stator 106a, the locking members 822 are inserted through the slots 868 in the outer housing cylinder 862 and into the groove 820 in the stepped section 812 of the stepped tube 806 of the main rotor 802. As illustrated in FIG. 18, the locking members 822 have ramped projections 916 that allow the locking members 822 to be inserted into the slots 868, but that lock the locking members 822 into the slots 868 when fully inserted into the slots 868. As illustrated in FIG. 17, the main rotor receiving end 835 of the inner housing cylinder 838 of the inner housing 836 abuts the first radial abutment face 826 of the stepped section 812 of the stepped tube 806 of the main rotor 802 and the receiving end 864 of the outer housing cylinder 862 of the outer housing 834 abuts the second radial abutment face 828 of the stepped section 812 of the stepped tube 806 of the main rotor 802 when the main rotor 802 is fully inserted into the stator 106a. The data wires of the wiring in the arms 12a are connected to the L-shaped connectors 896 of the power leaf spring contacts 843 and the stator 106a with the main rotor 802 connected thereto are then fixed to one of the arms 12a (after a first optical connector 918 is inserted into the stator 106a with the main rotor 802 connected thereto) to prepare for assembly of the suspension arm assembly 10a.

The illustrated stator 106a with the main rotor 802 connected thereto includes the first optical connector 918 (FIGS. 26-29) that connects to the fiber optic cable of the wiring in the arm 12a and that allows (with a second optical connector 920) the optical signal to be transmitted through the separable infinite rotation fiber optic and slip ring joint 800. The first optical connector 918 includes a main holding tube 922 for holding the fiber optic cable 924 comprising a jacket 926 and a fiber optic 928. The main holding tube 922 includes an insertion end 921, a holding end 923 and an interior aperture 930 having the fiber optic cable 924 therein (shown with a truncated fiber optic cable 924 in FIG. 29, but not shown in FIG. 28). The interior aperture 930 includes a larger section 932 and a smaller section 934, with a step 936 between the larger section 932 and the smaller section 934.

In the illustrated example, the first optical connector 918 includes a first distance adjustment assembly 919 at the insertion end 921 thereof. The first distance adjustment assembly 919 provides for differences in distances between the main rotor 802 and the rotor connector 804 when connected as discussed in more detail below. The first distance adjustment assembly 919 includes a coil spring 938, a holding sleeve 940, a lock ring 962, an extension tube 966, an abutment sleeve 969 and an optic end holder 971.

Figure 29:
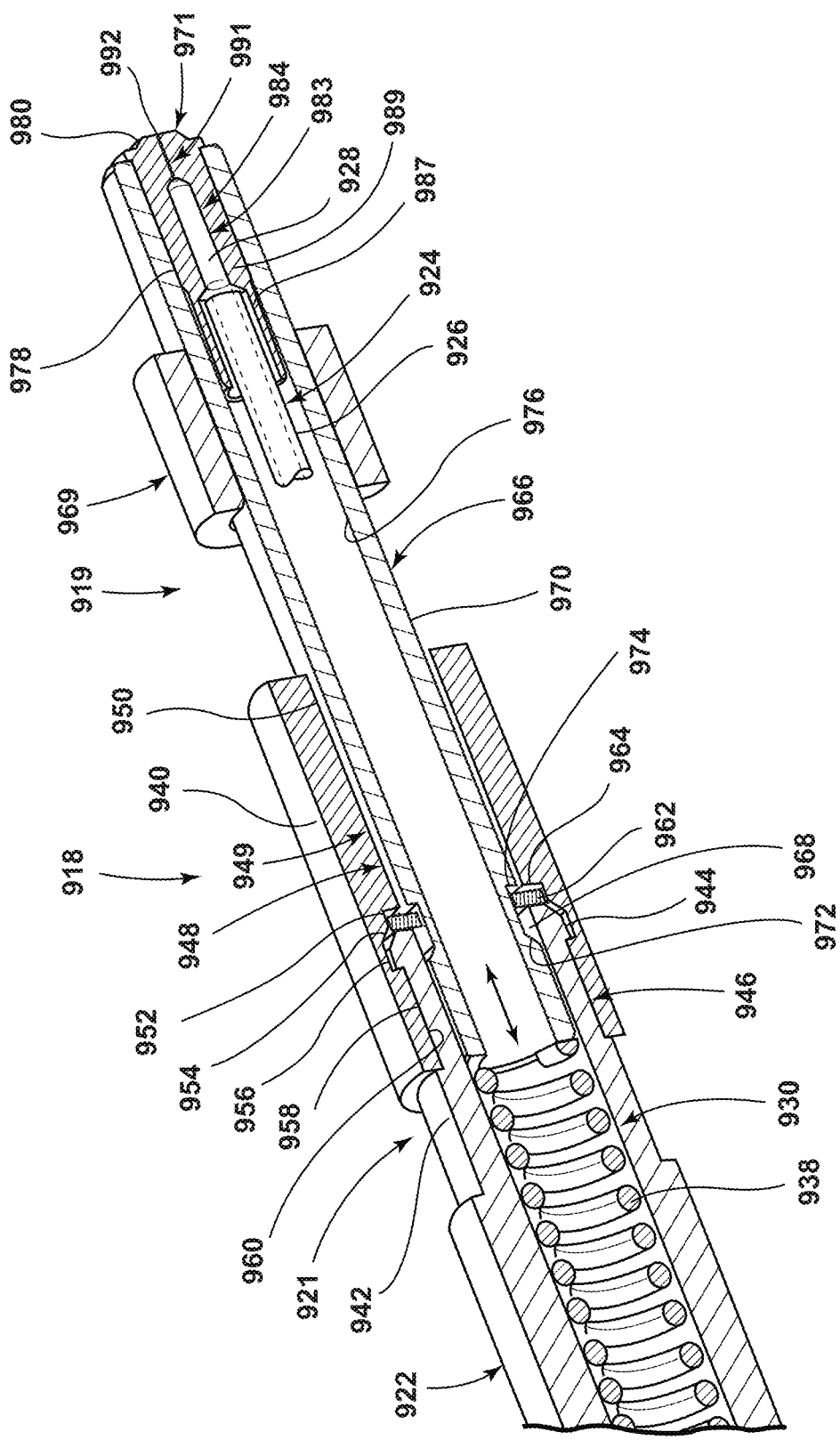
FIG. 29 is a partial perspective cross-sectional view of the first optical connector of the separable infinite rotation fiber optic and slip ring joint according to the present invention.

The illustrated holding sleeve 940 of the first distance adjustment assembly 919 holds the first distance adjustment assembly 919 on the main holding tube 922. As illustrated in FIG. 29, the holding sleeve 940 includes an axially extending hole 948 with an internal surface 949. The internal surface 949 has, moving toward the main holding tube 922, a first area 950 with a first diameter, a second area 952 with a second diameter, a ramp 954 leading to a third area 956 with a third diameter and a fourth area 958 having a fourth diameter. The third diameter is the largest diameter and the first diameter is the smallest diameter. The second diameter is between the first diameter and the fourth diameter and the fourth diameter is between the third diameter and the second diameter.

Figure 27:
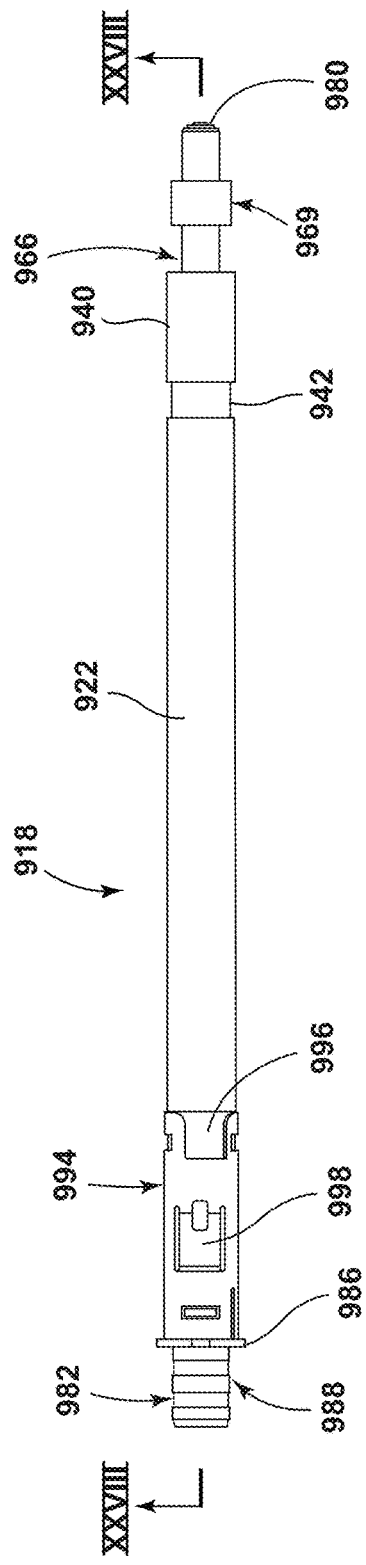
FIG. 27 is a side view of the first optical connector of the separable infinite rotation fiber optic and slip ring joint according to the present invention.
Figure 28:
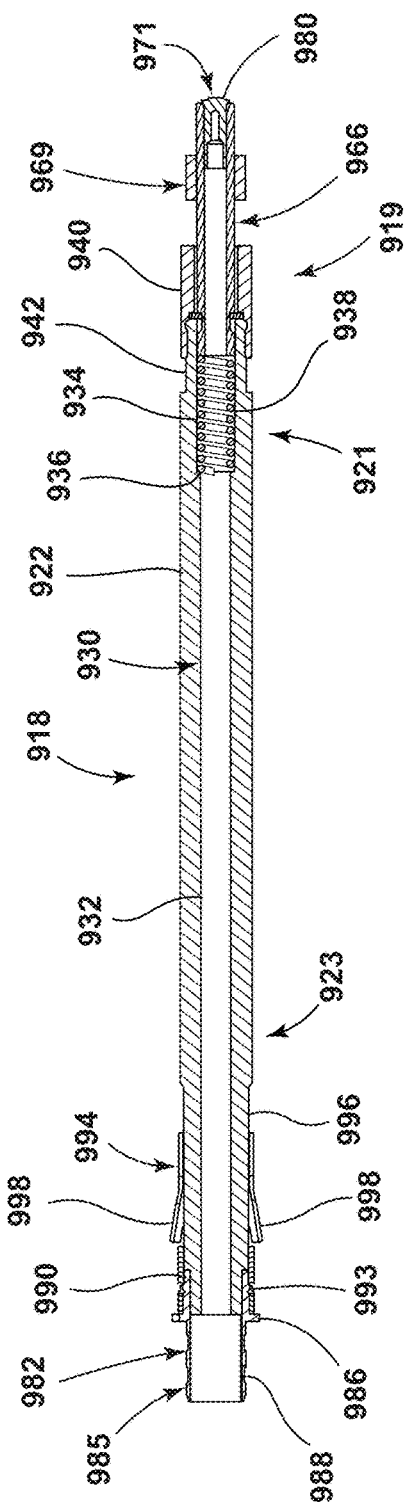
FIG. 28 is a cross-sectional view of the first optical connector of the separable infinite rotation fiber optic and slip ring joint according to the present invention taken along the line XXVIII-XXVIII of FIG. 27.

In the illustrated example, the holding sleeve 940 surrounds the insertion end 921 of the main holding tube 922 and is connected thereto. As illustrated in FIGS. 27-29, an exterior surface of the main holding tube 922 includes a recessed circumferential area 942 adjacent the insertion end 921 and a radially extending lip 944 at the terminal end of the insertion end 921. The holding sleeve 940 is located on the recessed circumferential area 942. The fourth area 958 of the internal surface 949 of the hole 948 of the holding sleeve 940 locks into a slot 960 in the recessed circumferential area 942 of the main holding tube 922 adjacent the radially extending lip 944. Moreover, the radially extending lip 944 extends into the third area 956 of the internal surface 949 of the hole 948 of the holding sleeve 940 to lock the holding sleeve 940 to the main holding tube 922.

As illustrated in FIG. 29, the lock ring 962 is located between the insertion end 921 of the main holding tube 922 and a step 964 between the first area 950 and the second area 952 of the internal surface 949 of the hole 948 of the holding sleeve 940. The lock ring 962 locks the extension tube 966 within the holding sleeve 940. The extension tube 966 is configured to slide within the interior aperture 930 of the main holding tube 922 at the insertion end 921 thereof and to also slide within the first area 950 of the internal surface 949 of the hole 948 of the holding sleeve 940. The extension tube 966 includes a circumferential recess 968 in an outer surface 970 thereof. The circumferential recess 968 includes an inner side edge 972 and an outer side edge 974. As illustrated in FIG. 29, the lock ring 962 extends into the circumferential recess 968 in the outer surface 970 of the extension tube 966. The extension tube 966 is allowed to slide within the main holding tube 922 and the holding sleeve 940 between a fully extended position wherein the lock ring 962 abuts the inner side edge 972 of the circumferential recess 968 and a fully retracted position (shown in FIG. 29) wherein the lock ring 962 abuts the outer side edge 974 of the circumferential recess 968. The abutment sleeve 969 surrounds the extension tube 966 and can also limit movement of the extension tube 966 relative to the main holding tube 922. It is contemplated that the abutment sleeve 969 can be made of any material. For example, the abutment sleeve 969 could be made of metal or of a ceramic material.

In the illustrated example, the coil spring 938 of the first distance adjustment assembly 919 is configured to move a portion of the first distance adjustment assembly 919 relative to the main holding tube 922. As illustrated in FIGS. 28 and 29, the coil spring 938 is located at the insertion end 921 of the main holding tube 922 and within the smaller section 934 of the interior aperture 930. A first end of the coil spring 938 abuts the step 936 between the larger section 932 and the smaller section 934 of the interior aperture 930. A second end of the coil spring 938 abuts the extension tube 966 and biases the extension tube 966 to the fully extended position.

The illustrated optic end holder 971 is located within the extension tube 966 opposite the coil spring 938 and holds a terminal end of the fiber optic cable 924. The optic end holder 971 includes an outer surface 978 engaged with an inner surface 976 of the extension tube 966. As illustrated in FIG. 27-29, a circumferential flange 980 extends radially outward from an end of the optic end holder 971. The circumferential flange 980 prevents the optic end holder 971 from sliding further into the extension tube 966. The optic end holder 971 has an axial aperture 983 with a stepped surface 984. Starting from within the extension tube 966, the stepped surface 984 includes a widest diameter area 987 receiving the fiber optic cable 924, with the widest diameter area 987 holding the jacket 926 of the fiber optic cable 924. The stepped surface 984 then has a middle diameter area 989 holding only the fiber optic 928 without the jacket 926. The stepped surface 984 then has a smallest diameter area 991 that is open. Light leaving the fiber optic travels through the axial aperture 983 within the stepped surface 984 at the smallest diameter area 991. It is contemplated that the smallest diameter area 991 could have a very short axial length such that the fiber optic 928 is very near or even at an end of the optic end holder 971. The optic end holder 971 includes an abutment end surface 992 outside of the smallest diameter area 991. As described in more detail below, the abutment end surface 992 is configured to abut or be very close to the second optical connector 920.

In the illustrated example, the first optical connector 918 includes a wiring connector 982 connected to the holding end 923 of the main holding tube 922. The wiring connector 982 includes a tube 985 having an outside radially extending flange 986 dividing the wiring connector 982 into a wiring connection end 988 and a holding tube connection end 990. The wiring connection end 988 of the wiring connector 982 surrounds an outside of the fiber optic cable 924 and allows the fiber optic cable 924 to slide therein if needed for movement of the fiber optic cable 924 as outlined below. It is contemplated that instead of having the fiber optic cable 924 pass through the tube 985, the wiring connection end can be any connector for connecting to a fiber optic cable (e.g., a SC, LC, FC, ST, SMA or pigtail type connector). The holding tube connection end 990 of the wiring connector 982 surrounds and is received within a first recessed area 993 at the holding end 923 of the main holding tube 922. A tube clip 994 surrounds the holding tube connection end 990 of the wiring connector 982 and a second recessed area 996 adjacent the first recessed area 993. The tube clip 994 includes a pair of extending spring ears 998 for fixing the first optical connector 918 within the stator 106a.

Figure 26:
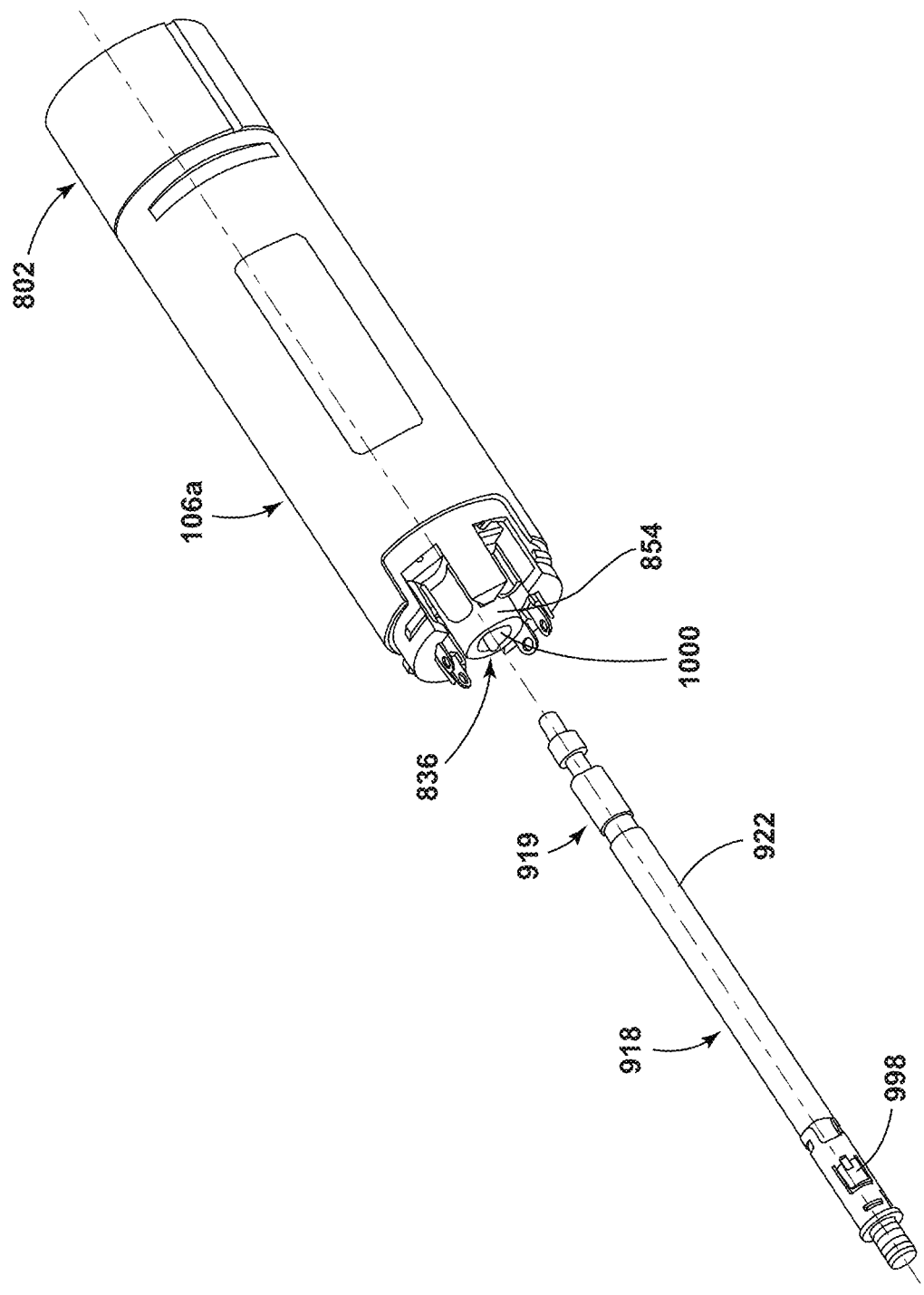
FIG. 26 is an exploded view of the main rotor of the rotor, the stator and the first optical connector of the separable infinite rotation fiber optic and slip ring joint according to the present invention.

As illustrated in FIG. 26, the first optical connector 918 is connected to the stator 106a by inserting the first optical connector 918 into the central tube 854 of the inner housing 836 of the stator 106a, with the optic end holder 971 being inserted first into the central tube 854. As the first optical connector 918 is inserted into the central tube 854 of the inner housing 836 of the stator 106a, the extending spring ears 998 of the tube clip 994 will be depressed toward the second recessed area 996 of the main holding tube 922 by an interior surface 1000 of the central tube 854. As illustrated in FIG. 16, when the first optical connector 918 is fully inserted into the central tube 854 of the inner housing 836 of the stator 106a, the spring ears 998 will expand outward into recesses 1002 in the interior surface 1000 of the central tube 854 to positively lock the first optical connector 918 into the central tube 854 of the inner housing 836 of the stator 106a and prevent removal of the first optical connector 918 from the stator 106a.

As outlined above, the separable infinite rotation fiber optic and slip ring joint 800 includes the two-part separable rotor 114*a*, with the rotor connector 804 removably connected to the main rotor 802. The rotor connector 804 includes an insertion cylinder 1004 configured to be inserted into the main rotor 802 and an enlarged head 1006 at an end of the insertion cylinder 1004. The rotor connector 804 includes a stepped central aperture 1008 and a plurality of wiring openings 1010 parallel with and surrounding the stepped central aperture 1008. Each of the wiring openings 1010 is configured to receive one of the extension pins 832 of the main rotor 802 therein. Each of the wiring openings 1010 that receive an extension pin 832 that conducts power has a conducting tube 1012 therein as illustrated in FIG. 17. Each conducting tube 1012 includes a female receiving side 1014 for receiving one of the extension pins 832 of the main rotor 802 and a male side 1016 extending into the enlarged head 1006, with the male side 1016 configured to be inserted into a wiring connector as is well known to those skilled in the art. The wiring openings 1010 that receive the extension pins 832 that conduct data each have a conducting connector 1018 therein as illustrated in FIG. 32. Each of the conducting connectors 1018 has a pair of opposite female receptacles for receiving pins therein for transmitting data as is well known to those skilled in the art.

Figure 14:
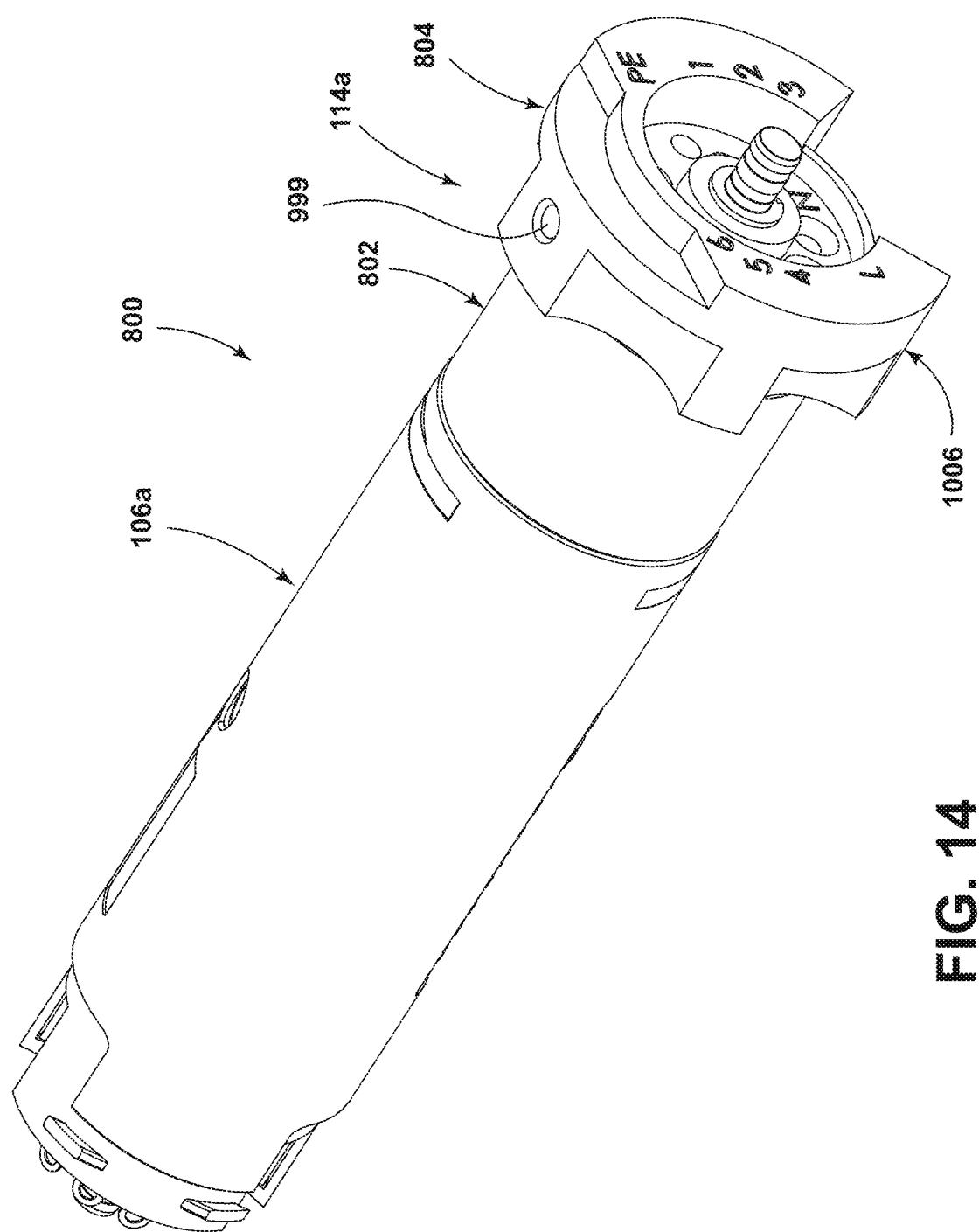
FIG. 14 is a perspective view of the separable infinite rotation fiber optic and slip ring joint according to the present invention.
Figure 15:
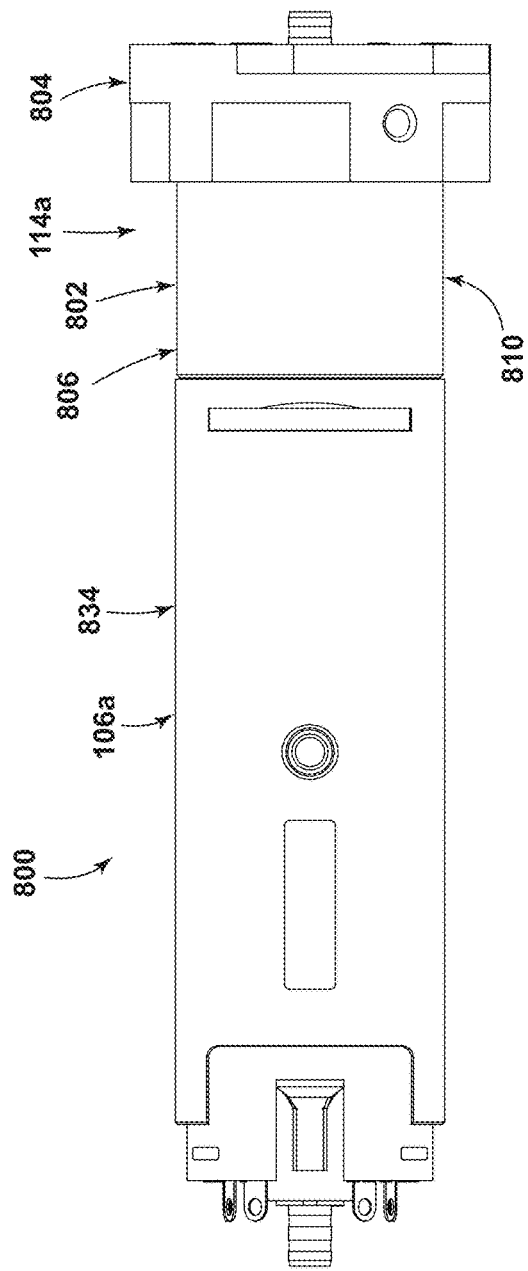
FIG. 15 is a side view of the separable infinite rotation fiber optic and slip ring joint according to the present invention.

In the illustrated example, the rotor connector 804 is connected to the main rotor 802 by inserting the insertion cylinder 1004 into the axial counterbore 824 of the large outer tube section 810 of the main rotor 802. As illustrated in FIG. 17, the main rotor 802 includes an alignment cylinder 1020 extending into the axial counterbore 824 and surrounding the axial opening 814 in the main rotor 802. The alignment cylinder 1020 is received within a largest area 1022 of the stepped central aperture 1008 of the rotor connector 804. An inner surface 1024 of the axial counterbore 824 can include one or more alignment flanges 1026 (see FIG. 18) configured to be received within axial slots 1028 on an outer surface of the insertion cylinder 1004 of the rotor connector 804 for properly aligning the rotor connector 804 within the main rotor 802. As illustrated in FIG. 19, a floor 1030 of the axial counterbore 824 can also include ridges 1032 configured to be received in channels 1031 in a bottom of the insertion cylinder 1004 for properly aligning the rotor connector 804 within the main rotor 802. Some of the ridges 1032 can include enlarged sections 1034 to further ensure proper rotational alignment of the insertion cylinder 1004 to ensure that the proper data and power lines are not mixed up. As illustrated in FIG. 14, the head 1006 can have a radially extending hole 999 configured to receive a fastener therein for fixing the rotor connector 804 in positon within one of the arms 12*a*.

Figure 34:
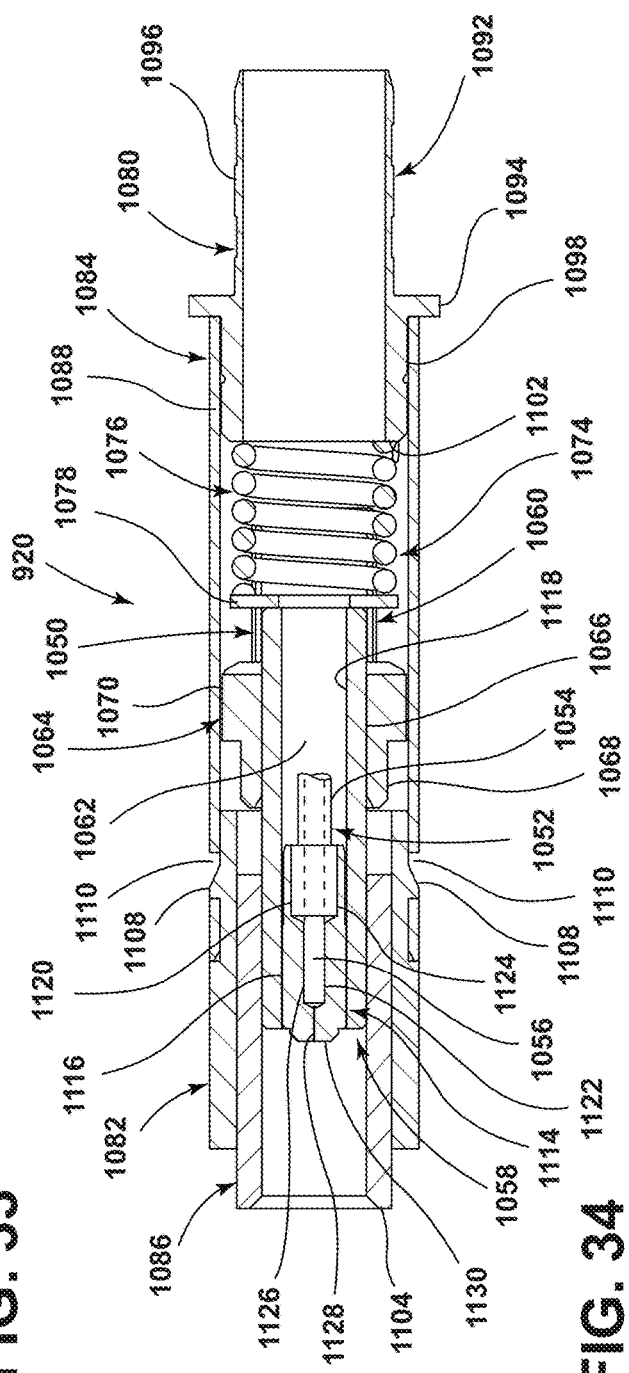
FIG. 34 is a cross-sectional view of the second optical connector of the separable infinite rotation fiber optic and slip ring joint according to the present invention taken along the line XXXIV-XXXIV of FIG. 33.
Figure 35:
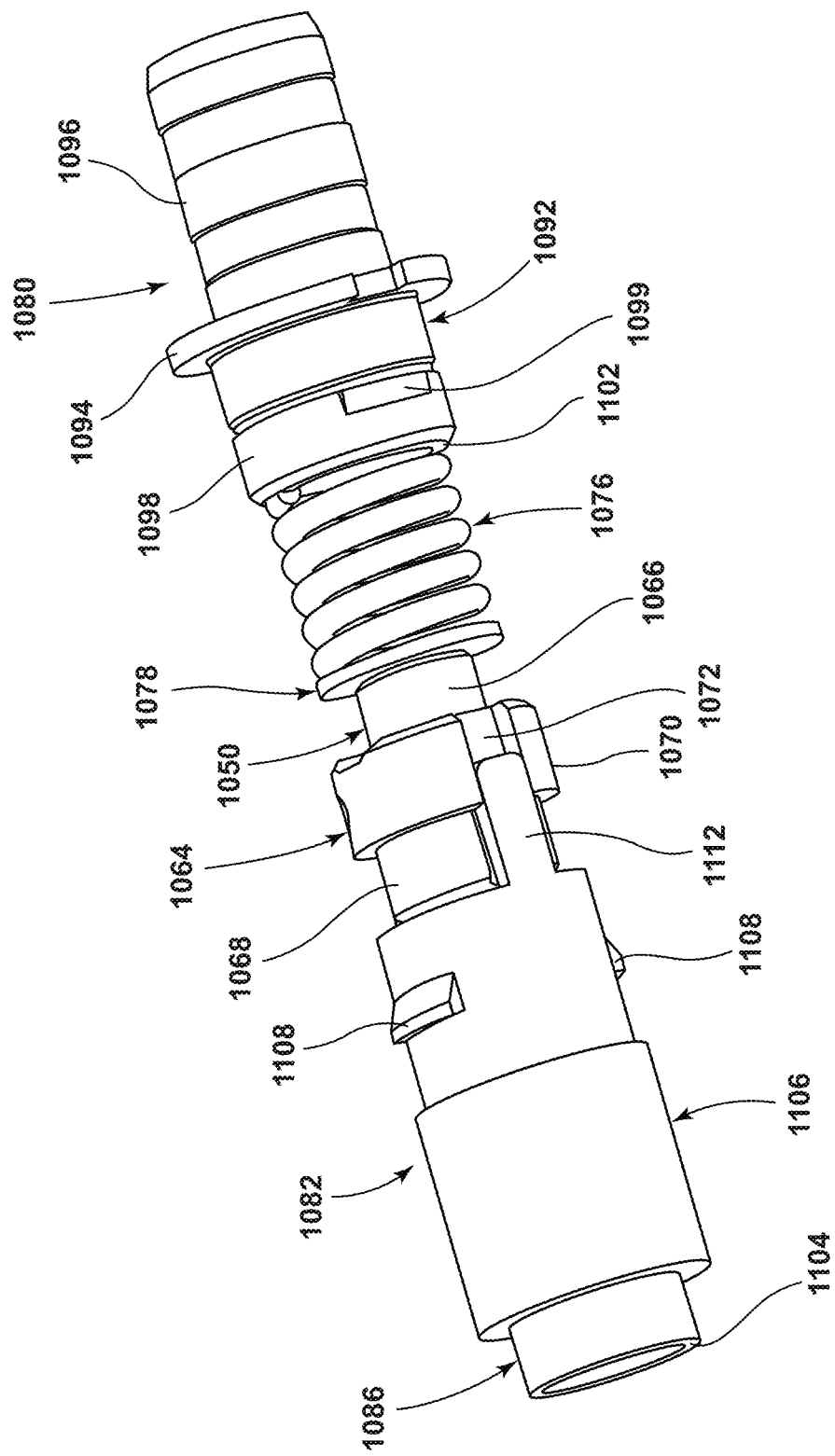
FIG. 35 is a perspective view of the second optical connector of the separable infinite rotation fiber optic and slip ring joint according to the present invention with the clip sleeve removed.

The illustrated rotor connector 804 includes the second optical connector 920 (FIGS. 31 and 33-35) that connects to the fiber optic cable of the wiring in the arm 12*a* and that allows (with the first optical connector 918) the optical signal to be transmitted through the separable infinite rotation fiber optic and slip ring joint 800. The second optical connector 920 includes a holding tube 1050 for holding a fiber optic cable 1052 comprising a jacket 1054 and a fiber optic 1056. The holding tube 1050 includes an insertion end 1058, a holding end 1060 and an interior aperture 1062 having the fiber optic cable 1052 therein (shown with a truncated fiber optic cable 1052 in FIG. 34). A stepped sleeve 1064 is fixed to an exterior surface 1066 of the holding tube 1050. The stepped sleeve 1064 includes a lower step 1068 at the insertion end 1058 and a higher step 1070 at the holding end 1060. As illustrated in FIG. 35, the higher step 1070 includes an axial slot 1072 to assist in sliding of the holding tube 1050 without rotation thereof.

In the illustrated example, the second optical connector 920 includes a second distance adjustment assembly 1074 at the insertion end 1062 thereof. The second distance adjustment assembly 1074 provides for differences in distances between the main rotor 802 and the rotor connector 804 when connected as discussed in more detail below. The second distance adjustment assembly 1074 includes a coil spring 1076, a washer 1078, a wiring connector 1080, a sliding sleeve 1082 and an abutment sleeve 1086 all held within a clip sleeve 1084.

Figure 33:
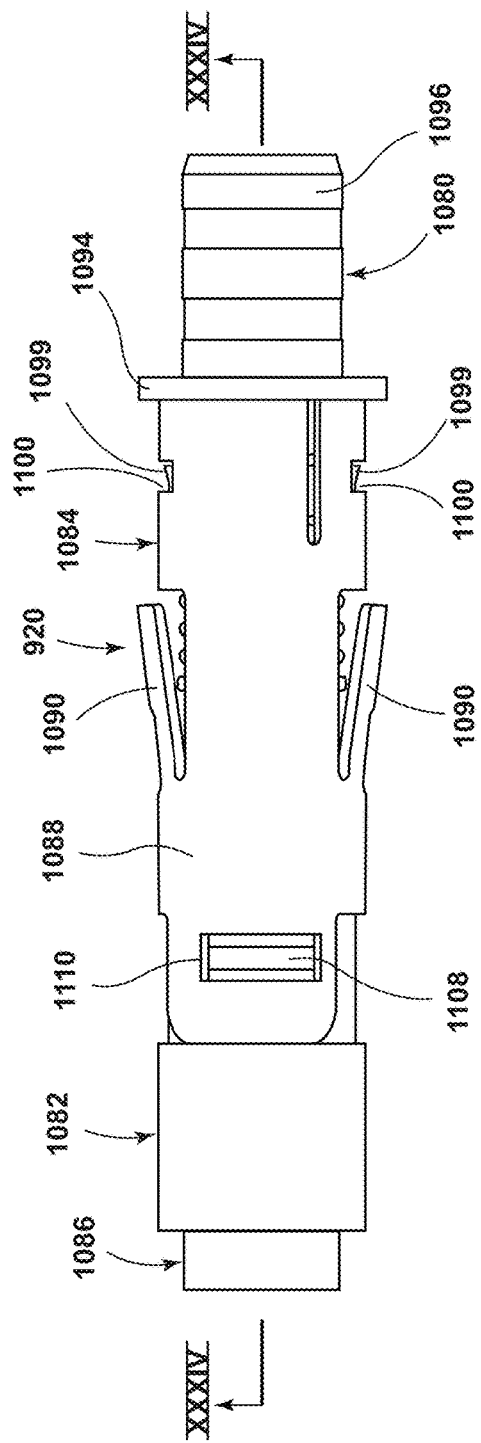
FIG. 33 is a side view of the second optical connector of the separable infinite rotation fiber optic and slip ring joint according to the present invention.

The illustrated clip sleeve 1084 holds the holding tube 1050, the stepped sleeve 1064, the coil spring 1076, the washer 1078, the wiring connector 1080, the sliding sleeve 1082 and the abutment sleeve 1086. The clip sleeve 1084 includes a tube 1088 having a pair of extending spring ears 1090 for fixing the second optical connector 920 within the rotor connector 804 as discussed in more detail below. The wiring connector 1080 is received within a first end of the clip sleeve 1084. The wiring connector 1080 includes a tube 1092 having an outside radially extending flange 1094 dividing the wiring connector 1080 into a wiring connection end 1096 and a sleeve connection end 1098. The wiring connection end 1096 of the wiring connector 1080 surrounds an outside of the fiber optic cable 1052 and allows the fiber optic cable 1052 to slide therein if needed for movement of the fiber optic cable 1052 as outlined below. It is contemplated that instead of having the fiber optic cable 1052 pass through the tube 1092, the wiring connection end can be any connector for connecting to a fiber optic cable (e.g., a SC, LC, FC, ST, SMA or pigtail type connector). The sleeve connection end 1098 of the wiring connector 1080 is surrounded by the clip sleeve 1084. As illustrated in FIG. 33, the sleeve connection end 1098 of the wiring connector 1080 includes radially extending ramped tabs 1099 that are inserted into first openings 1100 in the clip sleeve 1084 to connect the wiring connector 1080 to the clip sleeve 1084.

In the illustrated example, the coil spring 1076 pushes against the washer 1078 to move the holding tube 1050. As illustrated in FIGS. 34 and 35, the washer 1078 is located at (and can be connected to) the holding end 1060 of the holding tube 1050. One end of the coil spring 1076 pushes against the washer 1078. Another end of the coil spring 1076 abuts against an end rim 1102 of the sleeve connection end 1098 of the tube 1092 of the wiring connector 1080. The abutment sleeve 1086 surrounds and is fixed to the holding tube 1050 at the insertion end 1058 thereof. The abutment sleeve 1086 includes an abutment rim 1104 opposite the holding tube 1050. When the abutment rim 1104 is pushed, the abutment sleeve 1086 and thereby the holding tube 1050 and the washer 1078 are pushed against the bias of the coil spring 1076.

The illustrated sliding sleeve 1082 surrounds the abutment sleeve 1086 and the holding tube 1050 is allowed to slide within the sliding sleeve 1082. The sliding sleeve 1082 includes an outer surface 1106 with a pair of ramped tabs 1108. The sliding sleeve 1082 is inserted into the clip sleeve 1084 and the ramped tabs 1108 are inserted into second openings 1110 in the clip sleeve 1084 to connect the sliding sleeve 1082 to the clip sleeve 1084. The sliding sleeve 1082 includes radially extending projections 1112 that slide within the axial slots 1072 in the higher step 1070 of the stepped sleeve 1064 to assist in sliding of the holding tube 1050 without rotation thereof. Engagement of the sliding sleeve 1082 and the stepped sleeve 1064 also can limit axial movement of the stepped sleeve 1064 and the holding tube 1050 connected thereto.

The illustrated holding tube 1050 includes an optic end holder 1114 located within the interior aperture 1062 thereof opposite the coil spring 1076. The optic end holder 1114 holds a terminal end of the fiber optic cable 1052. The optic end holder 1114 includes an outer surface 1116 engaged with an inner surface 1118 of the holding tube 1050. The optic end holder 1114 has an axial aperture 1120 with a stepped surface 1122. Starting from within the holding tube 1050, the stepped surface 1122 includes a widest diameter area 1124 receiving the fiber optic cable 1052, with the widest diameter area 1124 holding the jacket 1054 of the fiber optic cable 1052. The stepped surface 1122 then has a middle diameter area 1126 holding only the fiber optic 1056 without the jacket 1054. The stepped surface 1122 then has a smallest diameter area 1128 that is open. Light leaving the fiber optic travels through the axial aperture 1120 within the stepped surface 1122 at the smallest diameter area 1128. It is contemplated that the smallest diameter area 1128 could have a very short axial length such that the fiber optic 1056 is very near or even at an end of the optic end holder 1114. The optic end holder 1114 includes an abutment end surface 1130 outside of the smallest diameter area 1128. As described in more detail below, the abutment end surface 1130 is configured to abut or be very close to the first optical connector 918.

As illustrated in FIG. 31, the second optical connector 920 is connected to the rotor connector 804 by inserting the second optical connector 920 into the stepped central aperture 1008 of the rotor connector 804, with the abutment sleeve 1086 being inserted first into the stepped central aperture 1008. As the second optical connector 920 is inserted into the stepped central aperture 1008 of the rotor connector 804, the extending spring ears 1090 of the clip sleeve 1084 will be depressed inward by an interior surface 1132 of the stepped central aperture 1008. As illustrated in FIG. 16, when the second optical connector 920 is fully inserted into the stepped central aperture 1008 of the rotor connector 804, the spring ears 1090 will expand outward into recesses 1136 in the interior surface 1132 of the stepped central aperture 1008 to positively lock the second optical connector 920 into the stepped central aperture 1008 of the rotor connector 804 and prevent removal of the second optical connector 920 from the rotor connector 804.

In the illustrated example, the construction of the separable infinite rotation fiber optic and slip ring joint 800 allows for variation in distances between the main rotor 802 and the rotor connector 804 during assembly of the suspension arm assembly 10a. In the illustrated example, the rotor connector 804 is inserted into the main rotor 802 when the adjacent arms 12a or an arm 12a and either the ceiling attachment member 24a or the display support assembly 18a are connected together. In the illustrated main rotor 802, the extension pins 832 are very long and do not need to be fully inserted into the wiring openings 1010 of the rotor connector 804 to be able to transmit power and data. Therefore, if assembly of the suspension arm assembly 10a results in the rotor connector 804 not being fully inserted into the main rotor 802, the suspension arm assembly 10a can still transmit power and data through the rotary joints thereof.

Figure 36:
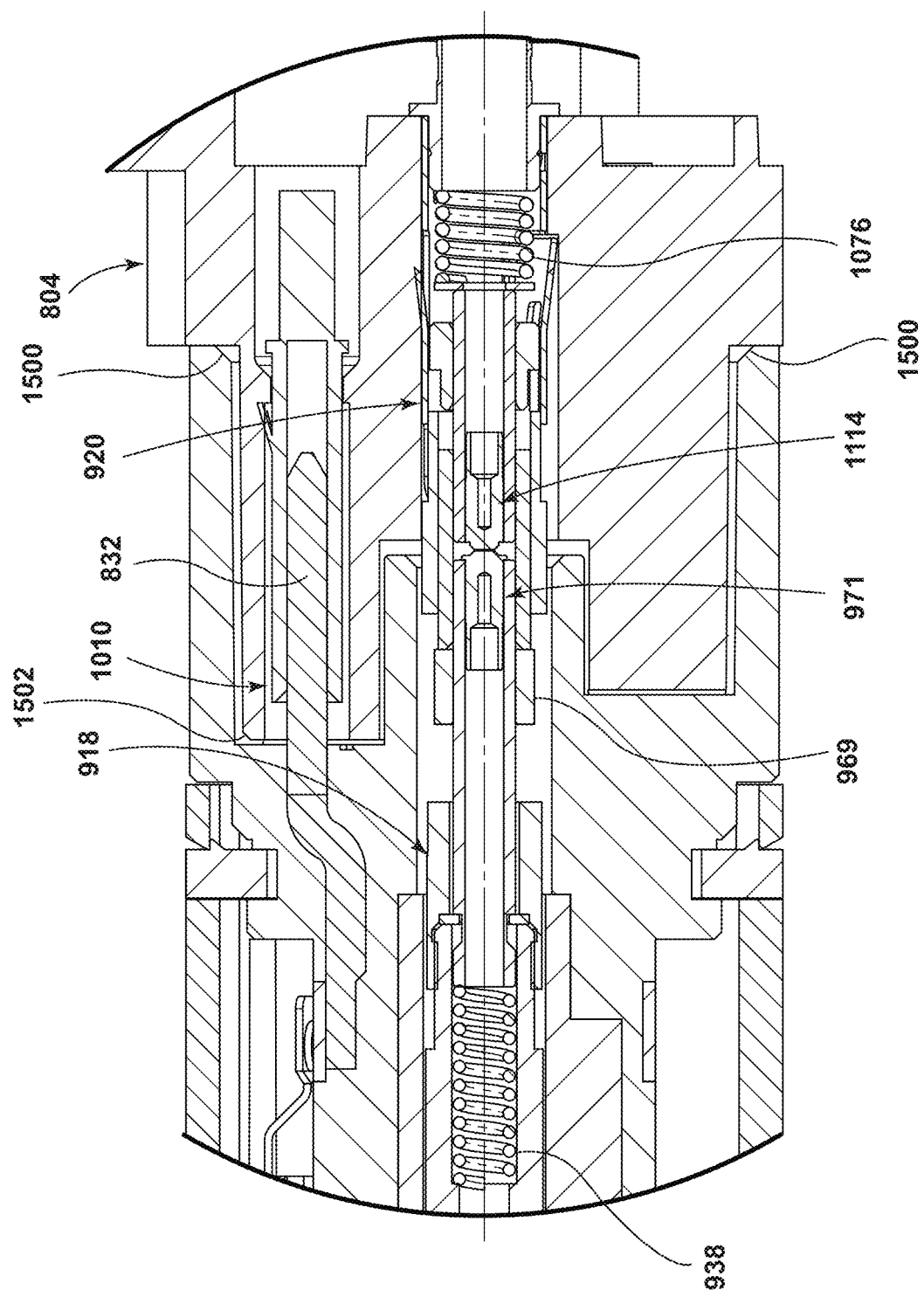
FIG. 36 is a close-up cross-sectional view of the separable infinite rotation fiber optic and slip ring joint according to the present invention.

The illustrated suspension arm assembly 10a also accommodates distances between the rotor connector 804 and the main rotor 802 for transmitting information over the fiber optic cables 924, 1052 through adjustments of the first optical connector 918 and the second optical connector 920. As illustrated in FIG. 36, when the rotor connector 804 is engaged with the main rotor 802, the coil spring 938 in the first optical connector 918 will bias the optic end holder 971 in the first optical connector 918 toward the second optical connector 920. Likewise, the coil spring 1076 in the second optical connector 920 will bias the optic end holder 1114 in the second optical connector 920 toward the first optical connector 918. The abutment sleeve 969 of the first optical connector 918 will abut against abutment rim 1104 of the abutment sleeve 1086 of the second optical connector 920 to maintain a desired distance between the optic end holder 971 in the first optical connector 918 and the second optical connector 920 toward the first optical connector 918. It is contemplated that the optic end holder 971 in the first optical connector 918 and the optic end holder 1114 in the second optical connector 920 could abut each other or could be spaced. Furthermore, it is contemplated that the optic end holder 971 in the first optical connector 918 and the optic end holder 1114 in the second optical connector 920 could have a limited range of motion (e.g., up to 2 mm). The first optical connector 918 and the second optical connector 920 thereby ensure that the optic end holder 971 in the first optical connector 918 and the optic end holder 1114 in the second optical connector 920 are sufficiently close to transmit optical signals across the separable infinite rotation fiber optic and slip ring joint 800 without significant loss of information.

In the illustrated example, the separable infinite rotation fiber optic and slip ring joint 800 can easily be connected during assembly of the arms 12a holding each portion of the separable infinite rotation fiber optic and slip ring joint 800. Many of the features of the separable infinite rotation fiber optic and slip ring joint 800 allow for easy assembly and can be used to blind mate the separate portions of the separable infinite rotation fiber optic and slip ring joint 800. For example, the separate portions of the separable infinite rotation fiber optic and slip ring joint 800 can be gatherable to allow for the separate portions to gather and align during mating. FIGS. 16-18, 30 and 36 illustrate an example of a gatherable feature of the separable infinite rotation fiber optic and slip ring joint 800. As illustrated in FIGS. 16-18, 30 and 36, the edge of the large outer tube section 810 of the stepped tube 806 of the main rotor 802 includes an inwardly extending and circular beveled surface 1500. Likewise, the insertion cylinder 1004 of the rotor connector 804 includes an edge having an outwardly extending and circular beveled surface 1502. The inwardly extending and circular beveled surface 1500 and the outwardly extending and circular beveled surface 1502 are configured to abut and center the main rotor 802 as the rotor connector 804 is inserted into the main rotor 802. The axial slots 1028 on the insertion cylinder 1004 of the rotor connector 804 and the alignment flanges 1026 on the inner surface 1024 of the axial counterbore 824 of the large outer tube section 810 of the stepped tube 806 of the main rotor 802 can also assist in mating the separate portions of the separable infinite rotation fiber optic and slip ring joint 800. It is contemplated that further angled surfaces between the main rotor 802 and the rotor connector 804 can function as a funnel to rotate one of the main rotor 802 and the rotor connector 804 as they are pressed together to properly align the main rotor 802 and the rotor connector 804.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An infinite rotation joint for passing at least an optical signal through the infinite rotation joint and for allowing an adjacent pair of suspension arm members to have unlimited rotation relative to one another, the infinite rotation joint comprising:
   a first portion for mounting to a first member of the adjacent pair of suspension arm members; and
   a second portion for mounting to a second member of the adjacent pair of suspension arm members,
   wherein the first and second portions are separable from one another such that they can be separately mounted to the first and second members prior to connecting the first and second members together,
   wherein the second portion comprises a sliding fiber optic cable holder for holding a fiber optic cable, the sliding fiber optic cable holder being configured to linearly move relative to the rest of the second portion as the second portion is being connected to the first portion to allow for variation in position of the second portion relative to the first portion when the first member and the second member are connected to each other, and
   wherein the sliding fiber optic cable holder is biased in a sliding direction of the sliding fiber optic cable holder by a spring.

2. The infinite rotation joint of claim 1, wherein high definition video, data and power can be transferred through the infinite rotation joint.

3. The infinite rotation joint of claim 2, wherein DC power can be transferred through the infinite rotation joint.

4. The infinite rotation joint of claim 1, wherein the infinite rotation joint comprises a stator and a rotor and one of the first portion and the second portion comprises the stator and a first section of the rotor and the other of the first portion and the second portion comprises a second section of the rotor.

5. The infinite rotation joint of claim 4, wherein the first section of the rotor is connected to the stator such that the first section of the rotor can rotate but not translate relative to the stator.

6. The infinite rotation joint of claim 4, wherein the first section of the rotor comprises a plurality of slip rings.

7. The infinite rotation joint of claim 1, wherein the first portion of the infinite rotation joint comprises a second fiber optic cable holder.

8. The infinite rotation joint of claim 1, wherein:
   the first and second portions of the infinite rotation joint are engaged by axially sliding a first one of the first and second portions of the infinite rotation joint into a second one of the first and second portions of the infinite rotation joint; and
   the first one of the first and second portions of the infinite rotation joint can transmit at least one of power and data to the second one of the first and second portions of the infinite rotation joint at a plurality of different axial locations of the first one of the first and second portions of the infinite rotation joint relative to the second one of the first and second portions of the infinite rotation joint.

9. The infinite rotation joint of claim 1, wherein:
   a first one of the first and second portions of the infinite rotation joint includes extension pins extending along a pin direction of connection parallel to a direction of movement of the first and second portions of the infinite rotation joint as the first and second portions of the infinite rotation joint are joined;
   a second one of the first and second portions includes elongated pin receptacles opening in the pin direction;
   the extension pins being configured to be slidably received within the elongated pin receptacles when the first and second portions are engaged to transmit power and/or data over the infinite rotation joint; and
   the extension pins can be linearly adjusted within the elongated pin receptacles in the pin direction without loss of transmission of power and/or data.

* * * * *